United States Patent [19]

Sano et al.

[11] Patent Number: 5,725,644
[45] Date of Patent: Mar. 10, 1998

[54] RECORDING LIQUID AND RECORDING METHOD ACCORDING TO INK-JET RECORDING SYSTEM USING THE SAME

[75] Inventors: Hideo Sano; Hiroshi Takimoto; Toru Nishimura; Masahiro Yamada; Takashi Hirasa, all of Yokohama, Japan

[73] Assignee: Mitsubishi Chemical Corp., Tokyo, Japan

[21] Appl. No.: 679,069

[22] Filed: Jul. 12, 1996

[30] Foreign Application Priority Data

| | | | |
|---|---|---|---|
| Jul. 14, 1995 | [JP] | Japan | 7-178447 |
| Nov. 17, 1995 | [JP] | Japan | 7-299450 |
| Nov. 21, 1995 | [JP] | Japan | 7-302523 |
| Dec. 20, 1995 | [JP] | Japan | 7-331825 |

[51] Int. Cl.$^6$ .................................. C09D 11/02
[52] U.S. Cl. .............. 106/31.48; 106/31.5; 106/31.52
[58] Field of Search ................. 106/31.48, 31.52, 106/31.5

[56] References Cited

U.S. PATENT DOCUMENTS

| | | | |
|---|---|---|---|
| 5,053,495 | 10/1991 | Greenwood et al. | 106/31.52 |
| 5,062,893 | 11/1991 | Adamic et al. | 106/31.52 |
| 5,198,022 | 3/1993 | Aulick et al. | 106/31.52 |
| 5,203,912 | 4/1993 | Greenwood et al. | 106/31.52 |
| 5,281,263 | 1/1994 | Gregory et al. | 106/31.52 |
| 5,370,730 | 12/1994 | Gregory et al. | 106/31.52 |
| 5,437,716 | 8/1995 | Sano et al. | 106/31.52 |
| 5,439,517 | 8/1995 | Yoshida et al. | 106/31.52 |
| 5,453,495 | 9/1995 | Gregory et al. | 106/31.48 |
| 5,478,384 | 12/1995 | Takimoto et al. | 106/31.52 |
| 5,580,965 | 12/1996 | Jager | 106/31.52 |
| 5,604,276 | 2/1997 | Suga | 106/31.52 |
| 5,647,897 | 7/1997 | Ouki et al. | 106/31.52 |

FOREIGN PATENT DOCUMENTS

| | | |
|---|---|---|
| 58-176261 | 10/1983 | Japan. |
| 2-140270 | 5/1990 | Japan. |
| 4-304274 | 10/1992 | Japan. |
| 6-220377 | 8/1994 | Japan. |
| 225 1625 A | 7/1992 | United Kingdom. |
| WO 92/13037 | 8/1992 | WIPO. |

*Primary Examiner*—Helene Klemanski
*Attorney, Agent, or Firm*—David G. Conlin; David S. Resnick; Dike, Bronstein, Roberts & Cushman, LLP

[57] ABSTRACT

A black-type recording liquid, even when used for ink-jet recording instruments or for recording with ordinary writing instruments on plain paper, is capable of forming a recorded image with high printing quality: high density, excellent color tone, and excellent water and light resistance, and is highly stable when stored for a long time.

38 Claims, No Drawings

RECORDING LIQUID AND RECORDING METHOD ACCORDING TO INK-JET RECORDING SYSTEM USING THE SAME

BACKGROUND OF THE INVENTION

The present invention relates to a recording liquid, and more specifically, it relates to a black-type recording liquid used for ink-jet recording and a recording method according to the ink-jet recording system using the recording liquid.

There is a so-called ink-jet recording system in practical use, in which the recording is performed by ejecting droplets of a recording liquid containing a water-soluble dye such as direct dye or acid dye or the like on paper from minute discharge orifices.

The recording liquid to be used in this ink-jet recording system are required that the stable discharge of the recording liquid can be conducted for long periods of time; that the recording liquid is fixed fast on a recording paper of common office use such as PPC (Plain Paper Copier) paper for electrophotographic use and fan-fold paper(continuous paper for computers) and that the high printing quality of the printed matter is formed, i.e., that clear-cut outlines of ink dots can be formed without blotting and also that the stability of the recording liquid during storage is excellent.

Accordingly, it is required that dyes used for the recording liquid is sufficiently soluble to the solvent of the recording liquid, remains in a stable state in the recording liquid even when stored for a long term, and provide printed image with a high density and an excellent water and light resistance.

However, it has been difficult to obtain a dye which can meet all these many requirements at once.

Many recording liquids have been proposed in order to meet the above-mentioned requirements (e.g. refer to Japanese Patent Application Laid-Open (KOKAI) Nos. 55-144067, 55-152747, 57-207660, 58-147470, 61-2776, 61-57666, 62-190269, 62-190271, 62-190272, 62-197476, 62-250082, 62-246975, 62-256974, 62-257971, 62-288659, 63-8463, 63-22867, 63-22874, 63-30567, 63-33484, 63-63764, 63-105079, 63-117079, 64-31877, 1-93389, 1-210464, 1-240584, 2-140270, 3-167270, 3-200882 and 5-262998). Nevertheless, none have achieved in providing a dye which fulfills the requirements of the market and is also easy to manufacture.

Further, there have been proposed black-type recording liquids using diazo-based dye in GB No. 2251625, WO No. 92/13037, Japanese Patent Laid-Open (KOKAI) Nos. 4-304274, 5-125318, 6-220377 and 7-34020, but each of these have been inferior in either the water resistance of the recording matter, the storage stability of the recording liquid, or the discharging stability, and none have been obtained to satisfy all of these requirements.

The present inventors have found that when using a specific compound as a dye for a recording liquid, there can be obtained a black-type recording liquid which, even when used for ink-jet recording instruments or for recording with ordinary writing instruments on plain paper, can form a recorded image with high printing quality such as a high density, an excellent color tone, and an excellent water and light resistance, and which is highly stable when stored for a long term. The present invention has been attained on the basis of this finding.

SUMMARY OF THE INVENTION

The object of the present invention is to provide a recording liquid which, even when used for recording on plain paper by means of ink-jet recording instruments or ordinary writing instruments, exhibits excellent print quality: the high density, and good water and light resistances of the printed image, and which remains in a highly stable state even when stored for a long term.

To accomplish these aims, in a first aspect of the present invention, there is provided a recording liquid comprising an aqueous medium and at least one dye selected from compounds whose free acid form represented by the following general formulae (1) through (10):

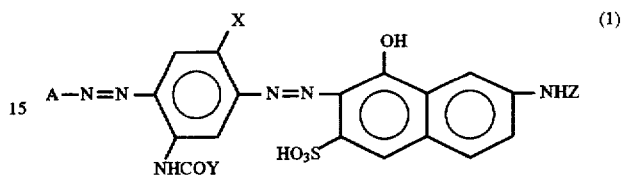

wherein A represents a phenyl group or naphthyl group which may have a substituent selected from the group consisting of an amino group, an acyl amino group, a hydroxyl group, a carboxylic acid group (—COOH) and a sulfonic acid group (—$SO_3H$); X represents a hydrogen atom, an alkyl group having 1 to 4 carbon atoms or an alkoxy group having 1 to 4 carbon atoms; Y represents

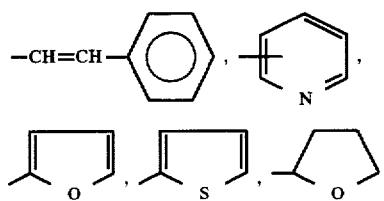

or —CH=CH—$CH_3$; and Z represents a hydrogen atom or a phenyl group which may have a substituent.

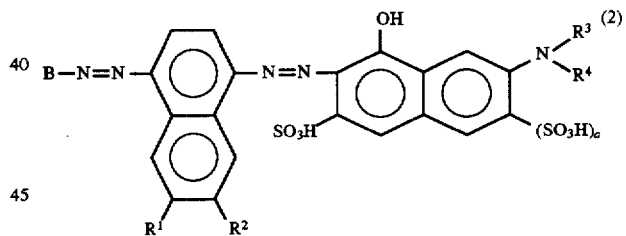

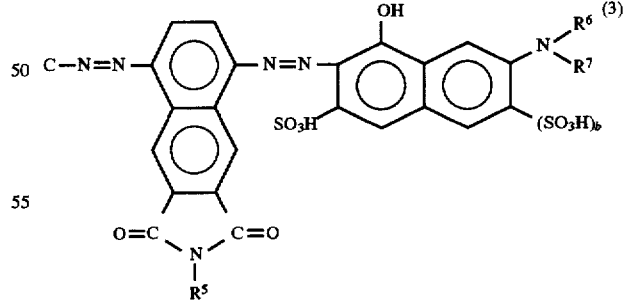

wherein B and C represent each independently represent a naphthyl group having a substituent of a —COOH group or a —$SO_3H$ group, or a phenyl group having a substituent selected from the group consisting of a —COOH group, a —$SO_3H$ group, an amino group, an acyl amino group, a hydroxyl group, a halogen atom, a substituted or unsubstituted alkyl group having 1 to 9 carbon atoms and a substituted or unsubstituted alkoxy group having 1 to 9 carbon atoms; $R^1$ and $R^2$ each independently represent a —COOH group or a —CONR$^8$R$^9$ group (provided that both of $R^1$ and $R^2$ never represent a —COOH group at the same time); $R^3$ and $R^6$ each independently represent a hydrogen atom, a phenyl group which may be substituted by a —SO$_3$H group or a —COOH group, or an alkyl group having 1 to 3 carbon atoms which is substituted with a —COOH group; $R^4$ and $R^7$ each independently represent a hydrogen atom or an alkyl group having 1 to 3 carbon atoms which is substituted with a —COOH group; $R^5$, $R^8$ and $R^9$ each independently represent a hydrogen atom or a substituted or unsubstituted alkyl group having 1 to 9 carbon atoms; a and b each independently are 0 or 1.

and $R^{22}$ each independently represent a hydrogen atom, a phenyl group which is substituted with a —SO$_3$H group or a —COOH group, or an alkyl group having 1 to 3 carbon atoms which is substituted with a —COOH group; $R^{13}$, $R^{16}$, $R^{20}$ and $R^{23}$ each independently represent a hydrogen atom or an alkyl group having 1 to 3 carbon atoms which may be substituted with a —COOH group; $R^{14}$, $R^{21}$, $R^{24}$, $R^{25}$, $R^{26}$ and $R^{27}$ each independently represent a hydrogen atom or a substituted or unsubstituted alkyl group having 1 to 9 carbon atoms; and c, d, e and f each independently are 0 or 1.

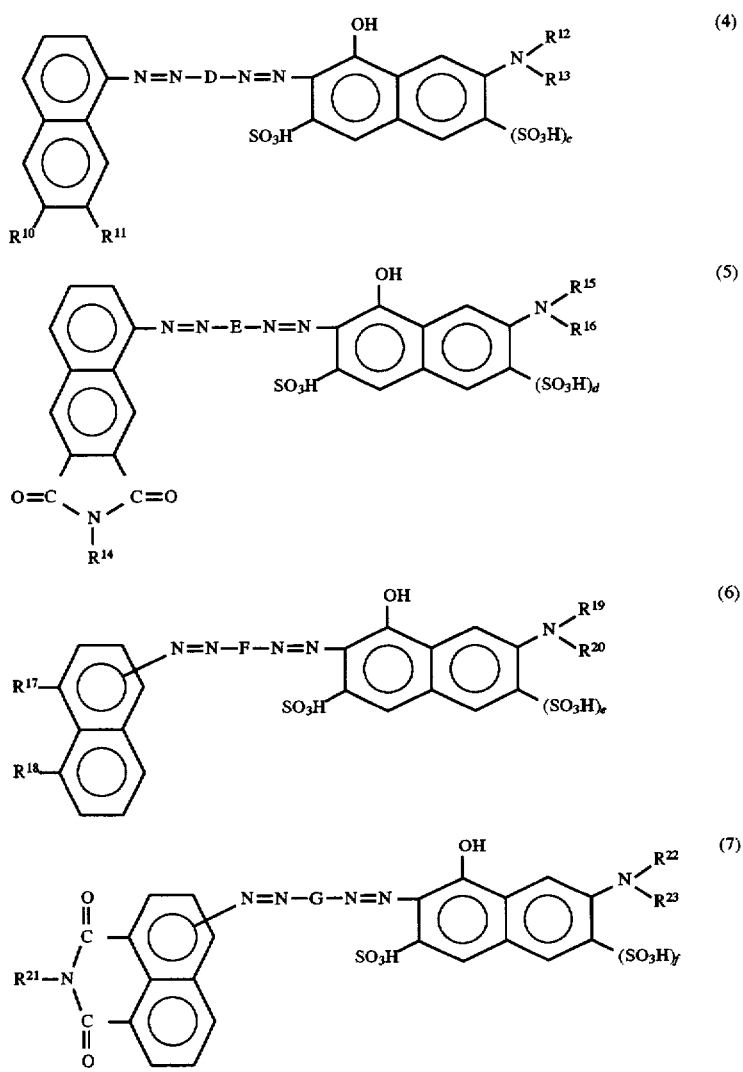

wherein $R^{10}$ and $R^{11}$ each independently represent a —COOH group or a —CONR$^{24}$R$^{25}$ group (provided that both of $R^{10}$ and $R^{11}$ never represent a —COOH group at the same time); $R^{17}$ and $R^{18}$ each independently represent a —COOH group or a —CONR$^{26}$R$^{27}$ group (provided that both of $R^{17}$ and $R^{18}$ never represent a —COOH group at the same time); D, E, F and G each independently represent the groups represented by the formula [I] or [II]; $R^{12}$, $R^{15}$, $R^{19}$

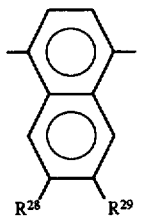

-continued

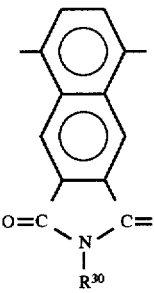

wherein $R^{28}$ and $R^{29}$ each independently represent a —COOH group or a —CONR$^{31}$R$^{32}$ group provided that both of $R^{28}$ and $R^{29}$ never represent a —COOH group at the same time); and $R^{30}$, $R^{31}$ and $R^{32}$ each independently represent a hydrogen atom or a substituted or unsubstituted alkyl group having 1 to 9 carbon atoms.

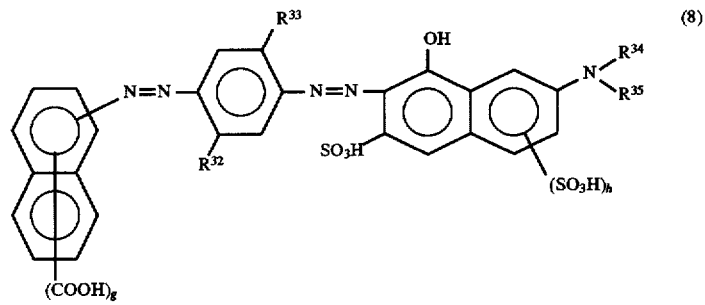
(8)

wherein $R^{32}$ represents a hydrogen atom, a —CH$_3$ group, a —OCH$_3$ group or a group represented by the formula [III], $R^{33}$ represents a hydrogen atom, a —CH$_3$ group or an —OCH$_3$ group when $R^{32}$ represents a hydrogen atom, a —CH$_3$ group or a —OCH$_3$ group; or $R^{33}$ represents a hydrogen atom, a substituted or unsubstituted alkyl group having 1 to 9 carbon atoms or a substituted or unsubstituted alkoxy group having 1 to 9 carbon atoms when $R^{32}$ represents a group represented by the formula [III]; $R^{34}$ represents a hydrogen atom, a phenyl group which may be substituted with a —SO$_3$H group or a —COOH group or an alkyl group having 1 to 3 carbon atoms which is substituted with a —COOH group; $R^{35}$ represents a hydrogen atom, or an alkyl group having 1 to 3 carbon atoms which is substituted with a —COOH group; g is 1 or 2; and h is 0 or 1.

—NHQR$^{36}$ [III]

wherein Q represents —CO— or —SO$_2$—; and $R^{36}$ represents an alkyl group having 1 to 6 carbon atoms or an aryl group having 6 to 12 carbon atoms.

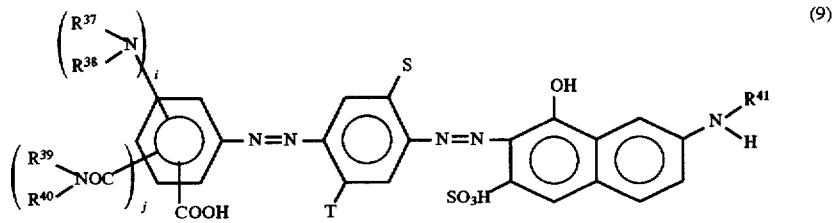
(9)

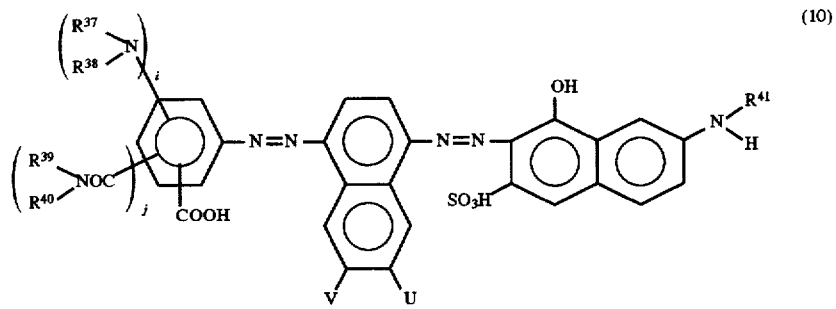
(10)

wherein $R^{37}$, $R^{38}$, $R^{39}$ and $R^{40}$ each independently represent an alkyl group having 1 to 4 carbon atoms which may be substituted with a morpholino group, an alkoxy group having 1 to 4 carbon atoms or an alkoxy-alkoxy group having 2 to 8 carbon atoms, or a hydrogen atom; $R^{37}$ and $R^{38}$, or $R^{39}$ and $R^{40}$ may be combined with a nitrogen atom to which $R^{37}$ and $R^{38}$, or $R^{39}$ and $R^{40}$ are bonded to form morpholino group, provided that both of $R^{37}$ and $R^{38}$ never represent a hydrogen atom at the same time; S and T each independently represent an alkoxy group having 1 to 4 carbon atoms, an alkyl group having 1 to 4 carbon atoms, or an acyl amino group having 2 to 9 carbon atoms; U and V each independently represent a —COOH group, a substituted or unsubstituted carbamoyl group or a morpholino carbonyl group, provided that both of U and V never represent a COOH group at the same time; $R^{41}$ represents a hydrogen atom or a phenyl group which may be substituted by a —COOH group; and i and j each independently are either 0 or 1, provided that both of i and j are never 0 at the same time.

DETAILED DESCRIPTION OF THE INVENTION

The present invention will be explained in detail.

The recording liquid of the present invention contains an aqueous medium and at least one of dyes represented in the afore-mentioned general formulae (1) through (10).

The dyes used in the present invention will be described in detail.

In the general formula (1), the acyl amino group as a substituent in a phenyl group or a naphthyl group denoted by A includes alkyl carbonyl groups having an alkyl group of 1 to 4 carbon atoms such as an acetyl amino group or propionyl amino group or benzoyl amino groups. Further, substituents in the phenyl group denoted by Z include a carboxylic acid group (—COOH), a sulfonic acid group (—$SO_3H$), an alkyl group having 1 to 4 carbon atoms, or an alkoxy group having 1 to 4 carbon atoms.

The group:

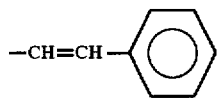

and —CH=CH—$CH_3$ denoted by Y may be either a trans form, a cis form, or the mixture thereof.

In the general formula (1), a compound wherein A and Z are independently phenyl group which has at least one —COOH as a substituent, and wherein X is an alkoxy group having 1 to 4 carbon atoms, is preferred.

Also, the dye represented by the formula (1) wherein Y is:

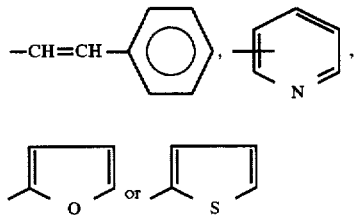

are preferred.

Moreover, the dye represented by the formula (1) wherein the number of —COOH group is the same as or more than the number of —$SO_3H$ group.

Specific examples of dyes which are the free acid form thereof are represented by the formulae (1-1) to (1-30) set forth below. (The examples shown are salt forms, bun it is needless to say that the kinds of salts are not limited to these.)

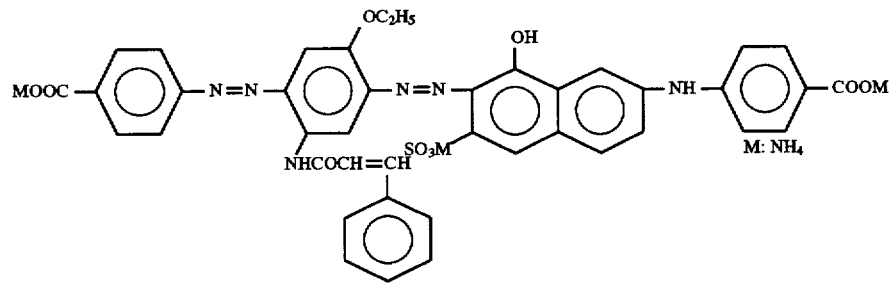

1-1

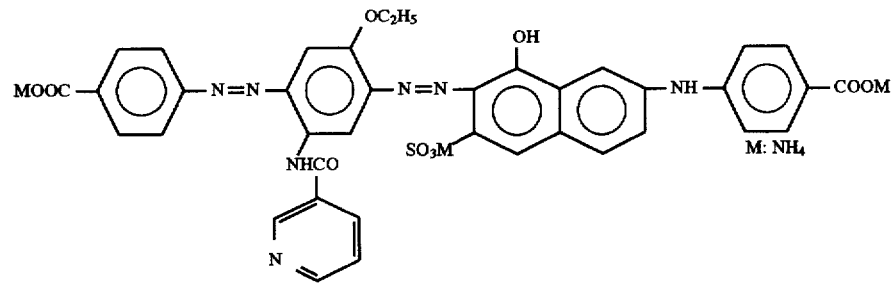

1-2

-continued
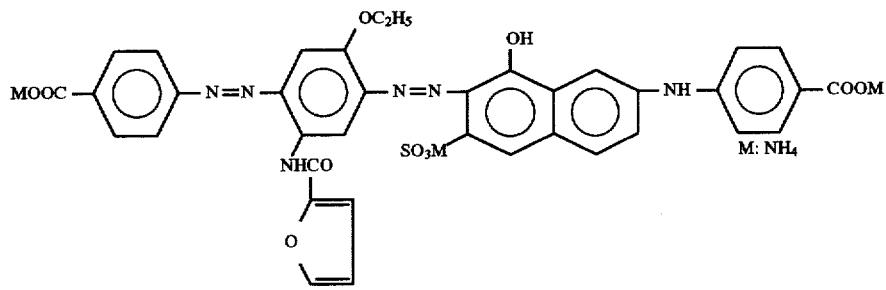
1-3
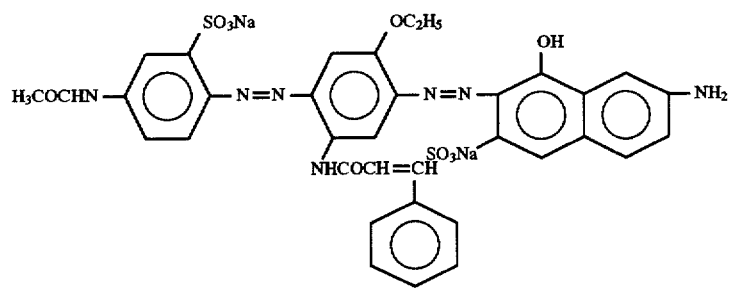
1-4
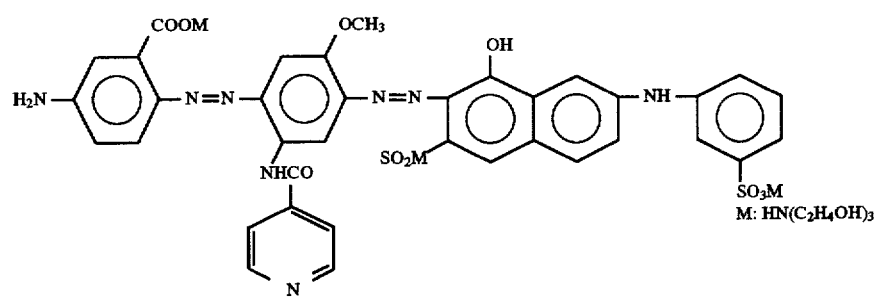
1-5
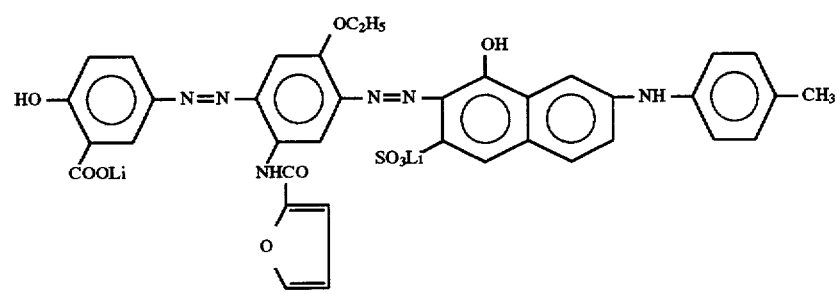
1-6
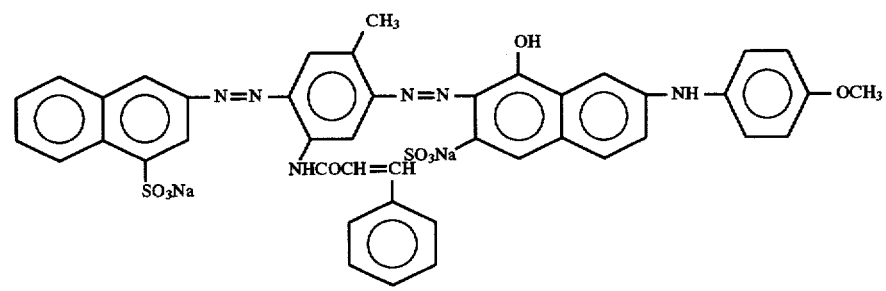
1-7

1-8
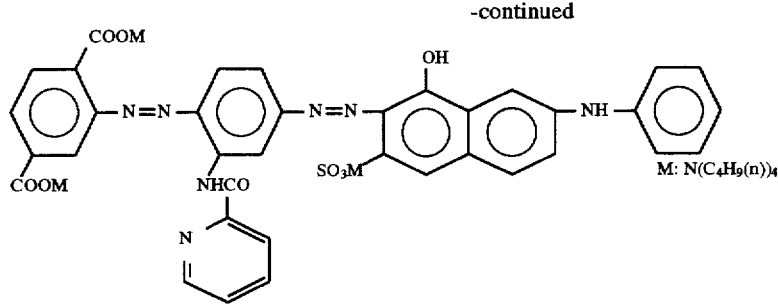
1-9
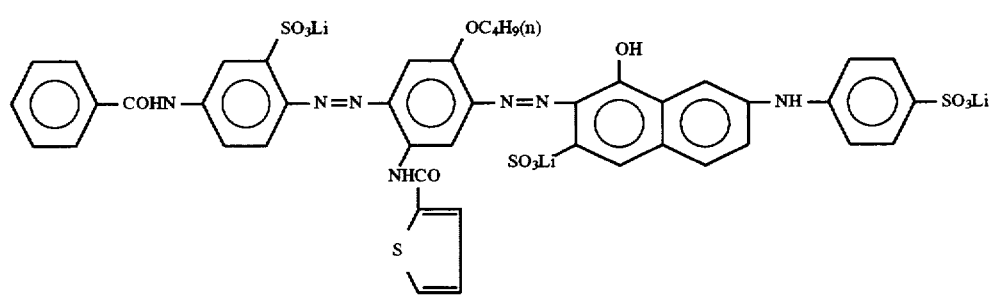
1-10
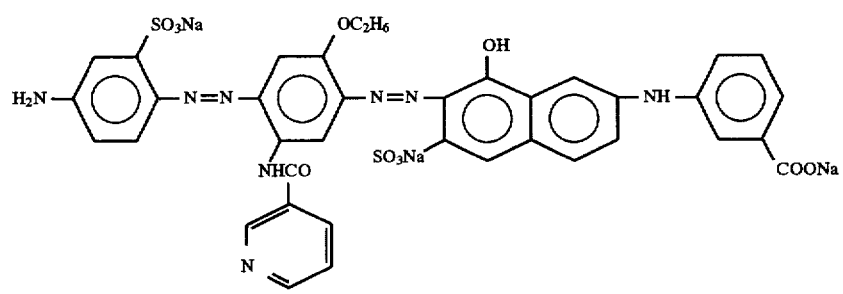
1-11
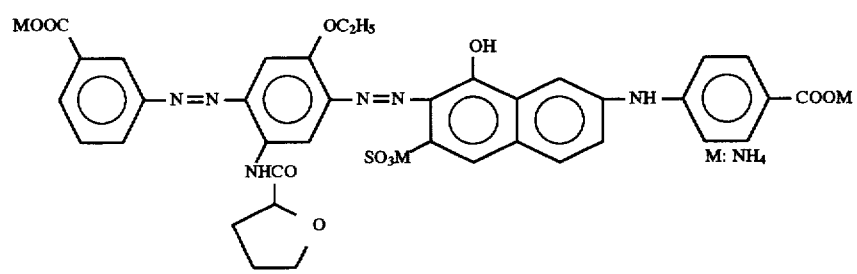
1-12
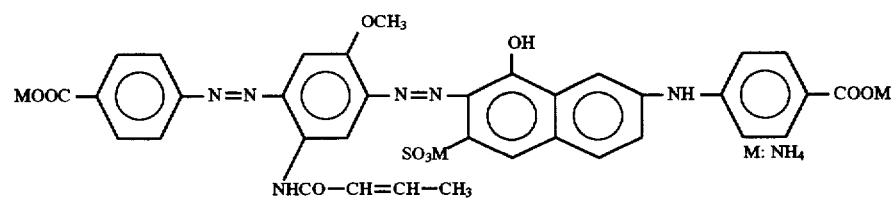
1-13
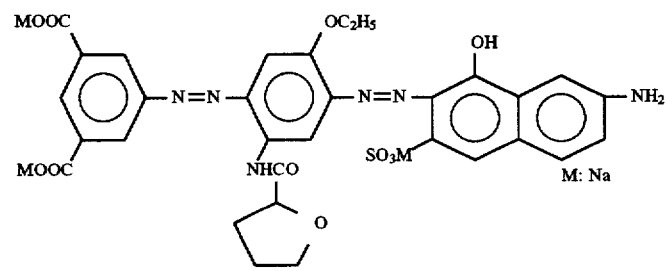

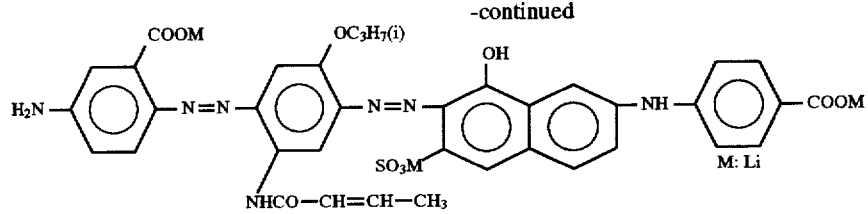
1-14
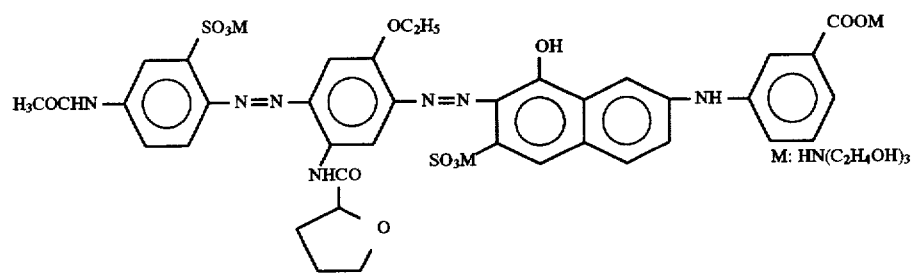
1-15
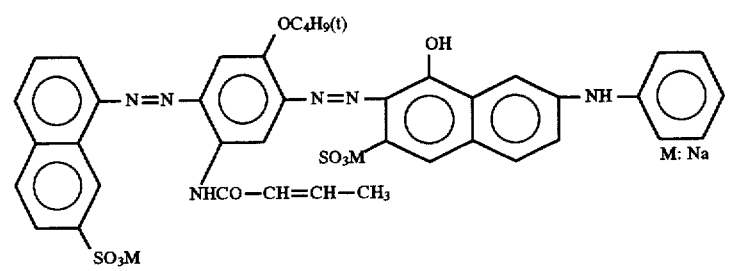
1-16
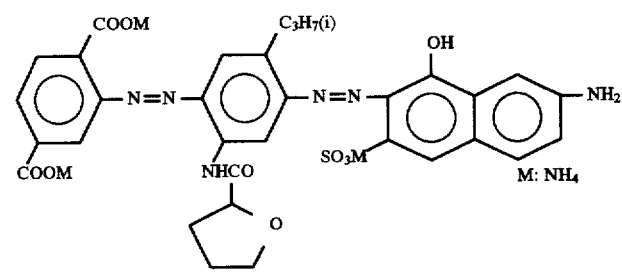
1-17
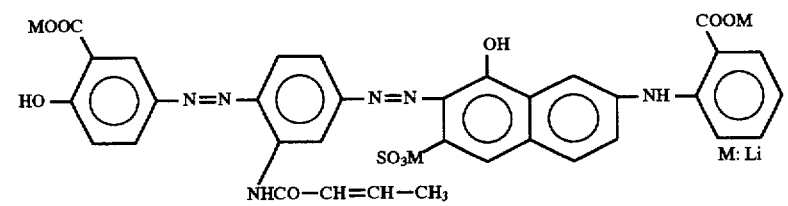
1-18
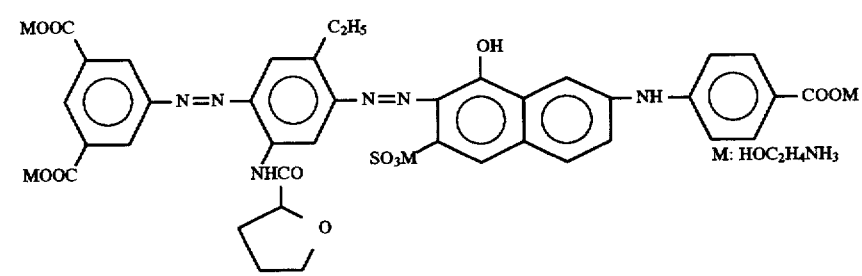
1-19
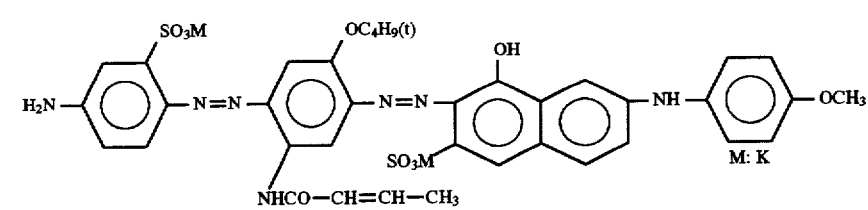
1-20

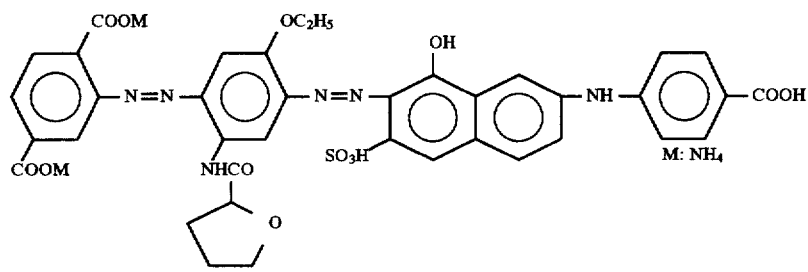
1-21
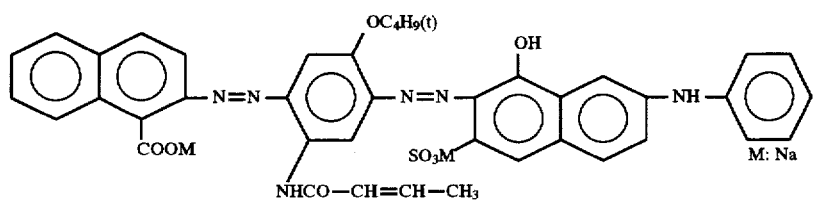
1-22
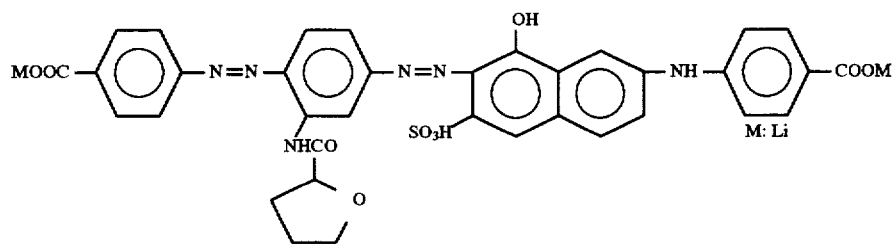
1-23
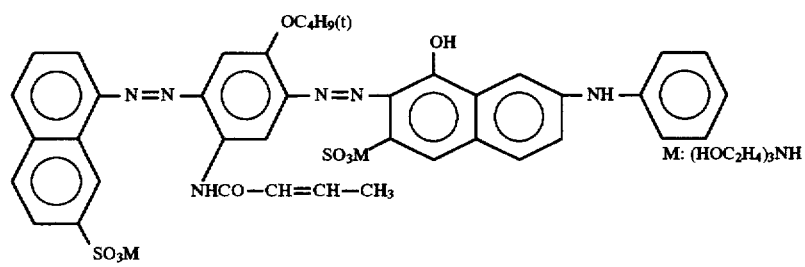
1-24
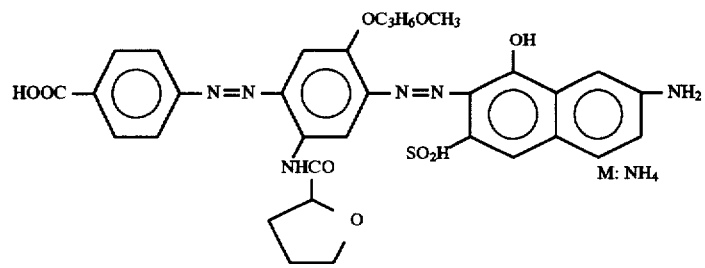
1-25
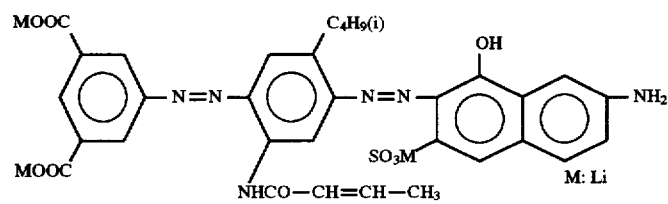
1-26

-continued

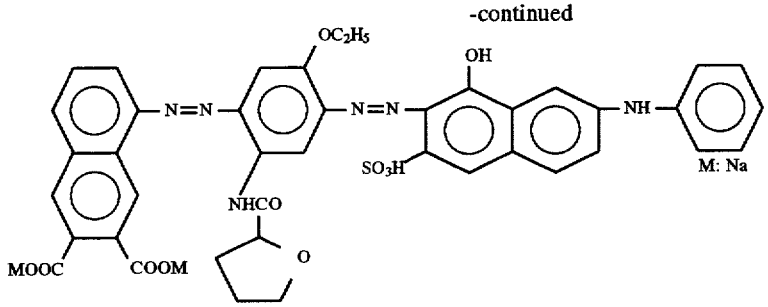

1-27

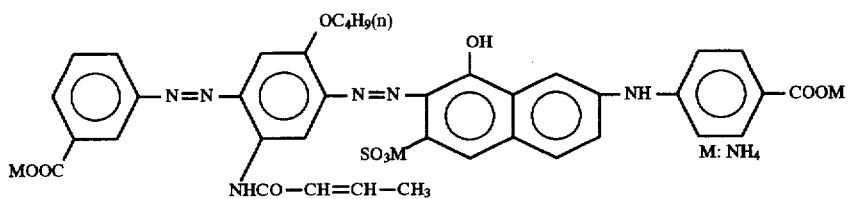

1-28

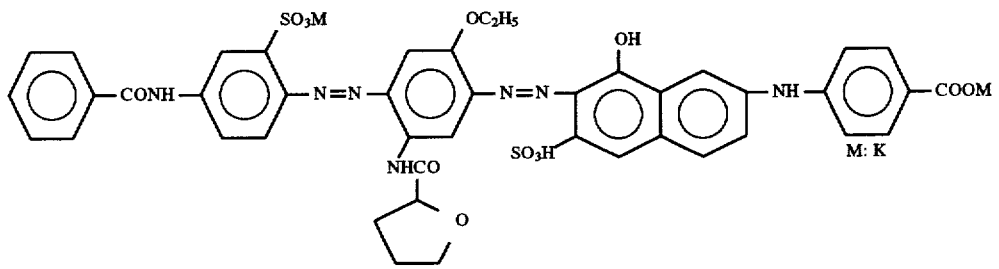

1-29

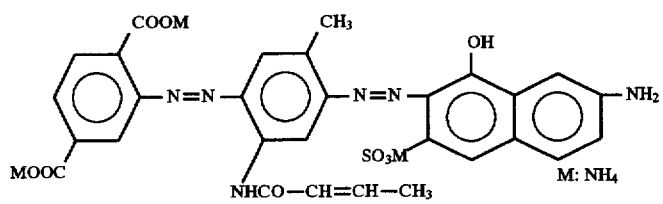

1-30

In the general formulae (2) and (3), the phenyl group denoted by B or C is a phenyl group having the substituent at least one selected from the group consisting of a —COOH group, a —SO$_3$H group, an amino group, an acyl amino group (e.g. an alkyl carbonyl amino group having 2 to 9 carbon atoms or an aryl carbonyl amino group having 7 to 11 carbon atoms), a hydroxyl group, a halogen atom such as a chlorine atom, a bromine atom and a fluorine atom, a substituted or unsubstituted alkyl group having 1 to 9 carbon atoms (e.g. straight-chain or branched alkyl groups having 1 to 9 carbon atoms such as methyl group, ethyl group, n-propyl group, isopropyl group, n-butyl group, etc., and the alkyl group substituted with a fluorine atom, or a substituted amino group such as trifluoro methyl group and dimethylamino methyl group), and a substituted or unsubstituted alkoxy group having 1 to 9 carbon atoms (e.g., a straight-chain or branched alkoxy group having 1 to 9 carbon atoms such as methoxy group, ethoxy group, isopropoxy group, n-butoxy group, etc., and the alkoxy group substituted with a hydroxyl group or an alkoxy group such as a hydroxy ethoxy group and a methoxy ethoxy group).

The naphthyl group denoted by B and C is a naphthyl group substituted with a —COOH group or a —SO$_3$H group.

Further, it is preferable than the phenyl group and naphthyl group denoted by B and C are a phenyl group and naphthyl group substituted with at least one —COOH substituent.

$R^3$ and $R^6$ represent a hydrogen atom, a phenyl group which may be substituted with a —SO$_3$H group or a —COOH group, or an alkyl group having 1 to 3 carbon atoms which is substituted with a —COOH group. $R^4$ and $R^7$ represent a hydrogen atom or an alkyl group having 1 to 3 carbon atoms which is substituted with a —COOH group. However, in the case where $R^4$ and $R^7$ are a hydrogen atom, $R^3$ and $R^6$ are preferably a hydrogen atom, or a phenyl group which may be substituted with a —SO$_3$H group or a —COOH group, and in the case where $R^4$ and $R^7$ represent an alkyl group having 1 to 3 carbon atoms which is substituted with a —COOH group. $R^3$ and $R^6$ are preferably a hydrogen atom or an alkyl group having 1 to 3 carbon atoms which is substituted with a —COOH group. Examples of the substituents for the alkyl groups denoted by $R^5$, $R^8$, or $R^9$ include an alkoxy group (e.g. CH$_3$O—, C$_2$H$_5$O—, n—C$_3$H$_7$O—, etc.), an alkoxy alkoxy group (e.g., CH$_3$OC$_2$H$_4$O—, etc.), an alkoxy alkoxy alkoxy group (e.g., CH$_3$OC$_2$H$_4$OC$_2$H$_4$O—, etc.), hydroxy groups, a hydroxy alkoxy group (e.g. HOC$_2$H$_4$O—, etc.), etc.

Further, in the general formulae (2) and (3), a compound wherein the number of —COOH group in the molecule is the same as or more than the number of —SO$_3$H group therein.

Specific examples of dyes which are the free acid form thereof are represented by the formulae (2-1) to (2-11) and (3-1) to (3-4) set forth below. (The examples shown are free acid forms.)

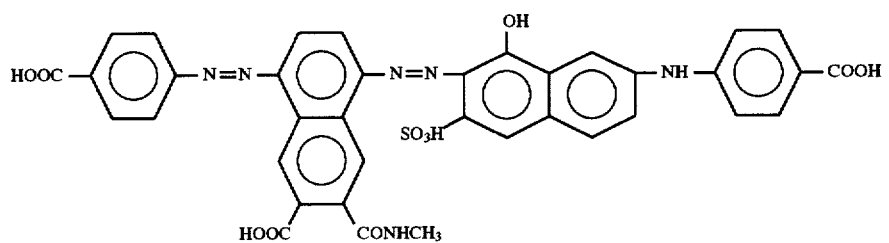
2-1
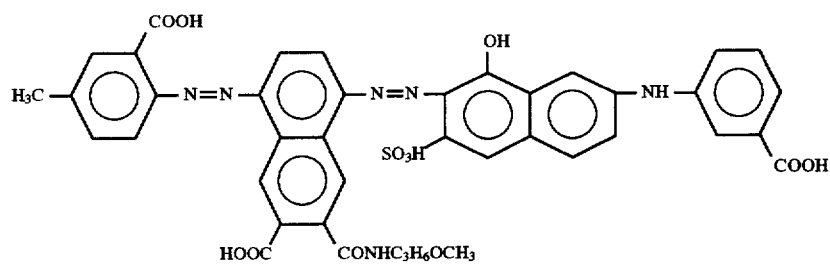
2-2
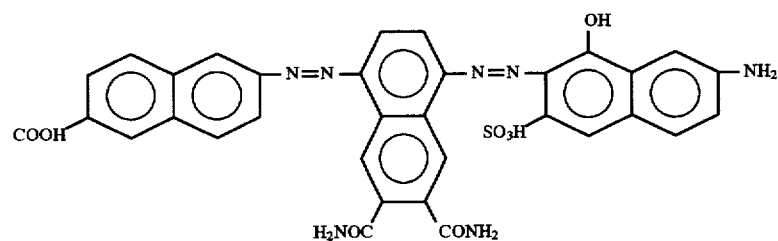
2-3
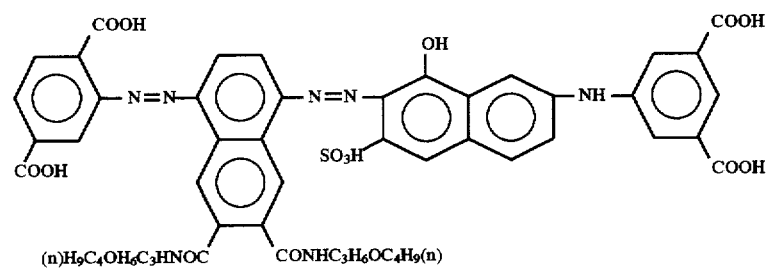
2-4
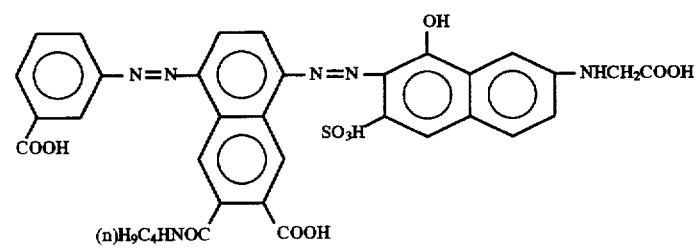
2-5
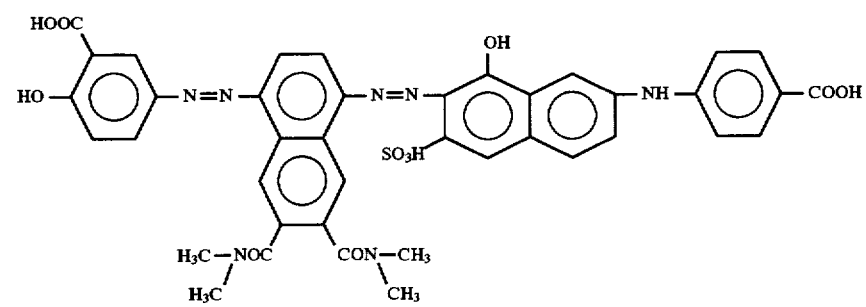
2-6

-continued
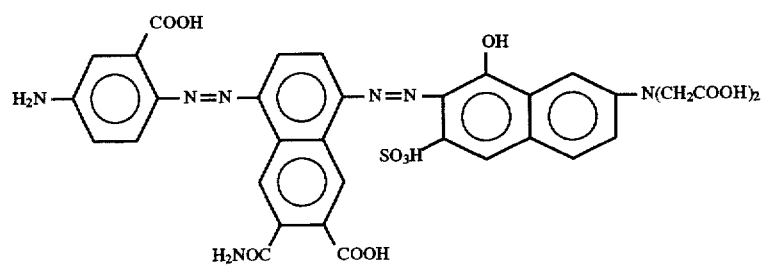
2-7
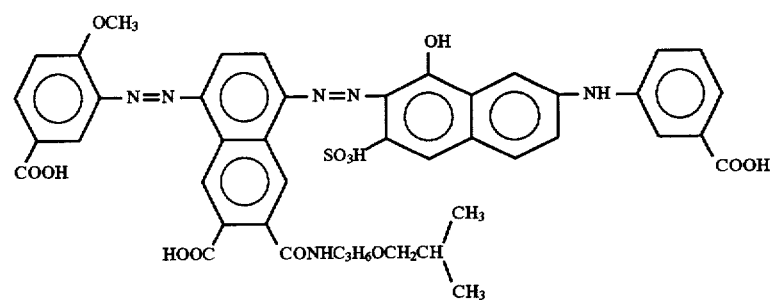
2-8
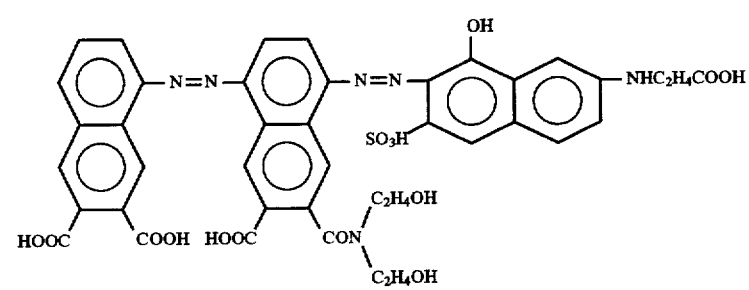
2-9
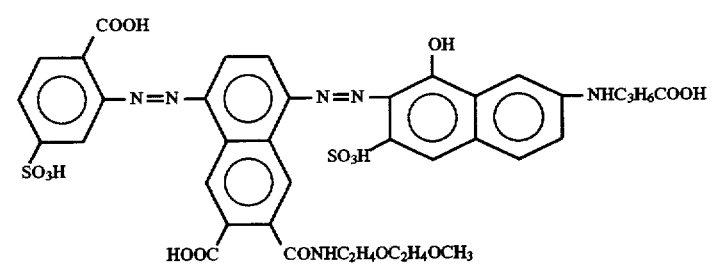
2-10
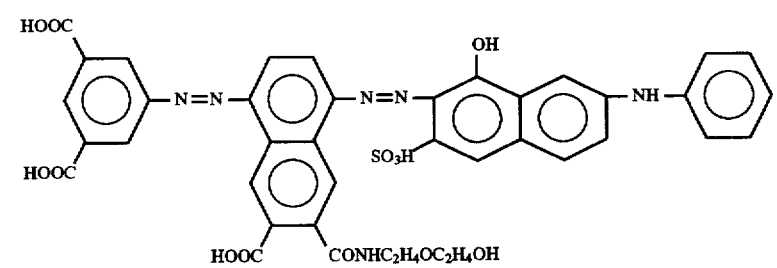
2-11

-continued

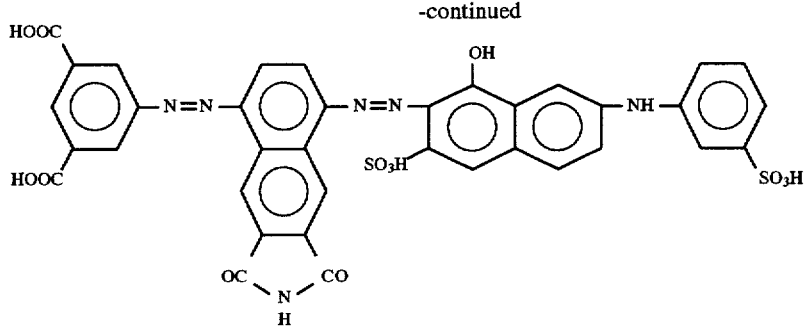

3-1

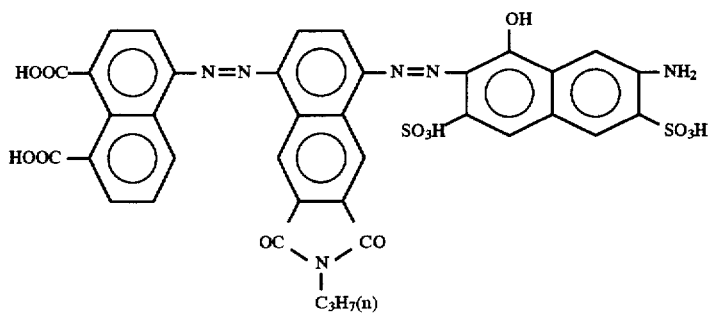

3-2

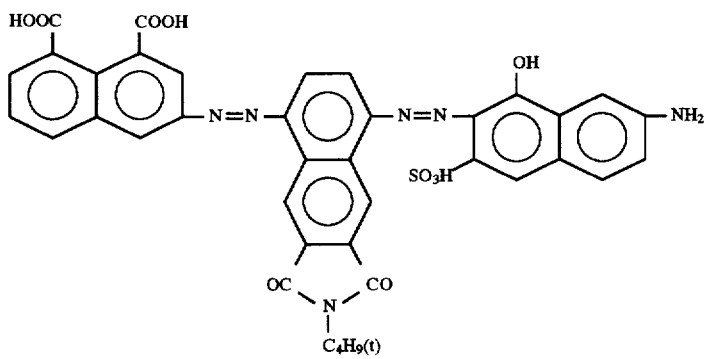

3-3

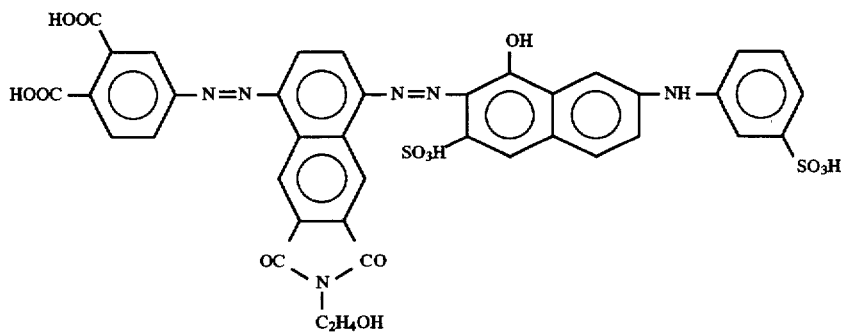

3-4

In the aforementioned general formulae (4), (5), (6) and (7), it is preferable that $R^{12}$, $R^{15}$, $R^{19}$ and $R^{22}$ are each independently phenyl group which may be substituted with —$SO_3H$ group or —COOH group, and that $R^{13}$, $R^{16}$, $R^{20}$, and $R^{23}$ each represent a hydrogen atom.

Further, examples of substituents for the alkyl group denoted by $R^{14}$, $R^{21}$, $R^{24}$, $R^{25}$, $R^{26}$, $R^{27}$, $R^{30}$, $R^{31}$ and $R^{32}$ include an alkoxy group such as methoxy group, ethoxy group and n-propoxy groups, an alkoxy alkoxy group such as 2-methoxy ethoxy group, an alkoxy alkoxy alkoxy group such as 2-(2-methoxy-ethoxy) ethoxy group, a hydroxyl group, a hydroxy alkoxy group such as 2-hydroxy ethoxy group.

In the general formulae (4), (5), (6) and (7), a compound wherein the number of —COOH group in the molecule is the same as or more than the number of —$SO_3H$ group therein.

Specific examples of dyes which are the free acid form thereof are represent by the formulae (4-1) to (4-5), (5-1) to (5-2), (6-1) to (6-6) and (7-1) to (7-2) shown below. (The examples show free acid forms.)

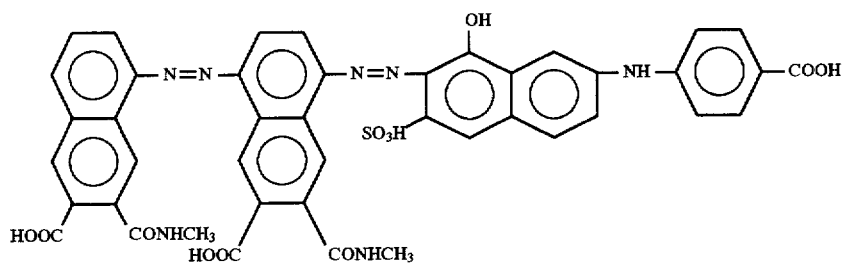
4-1
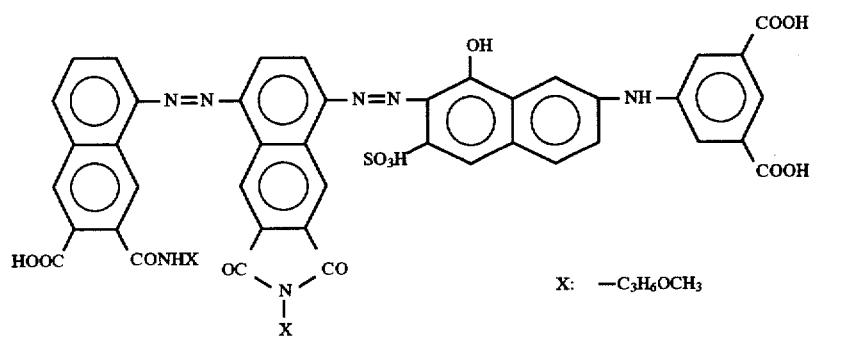
4-2
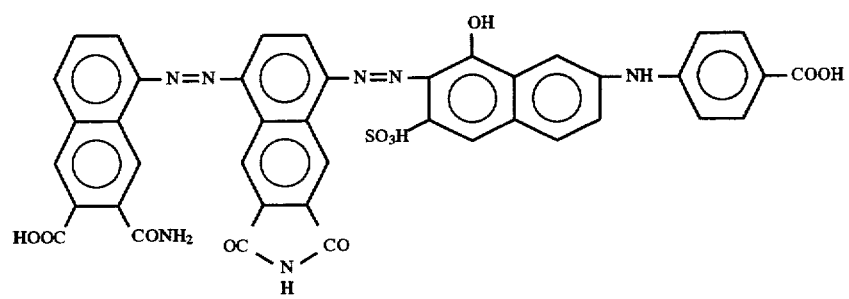
4-3
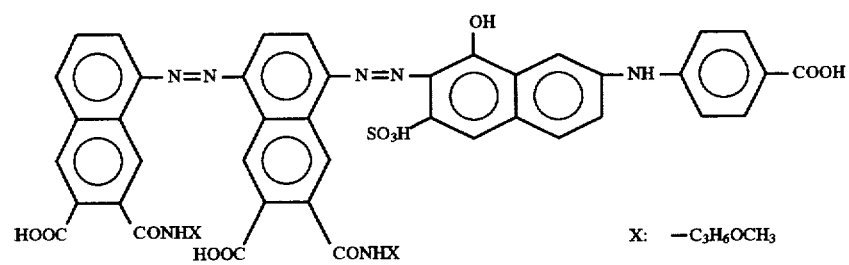
4-4
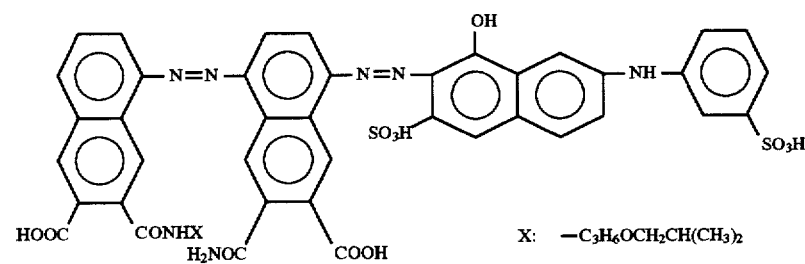
4-5

-continued
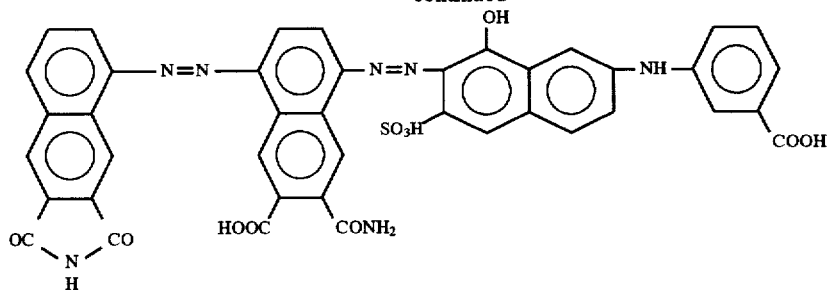
5-1
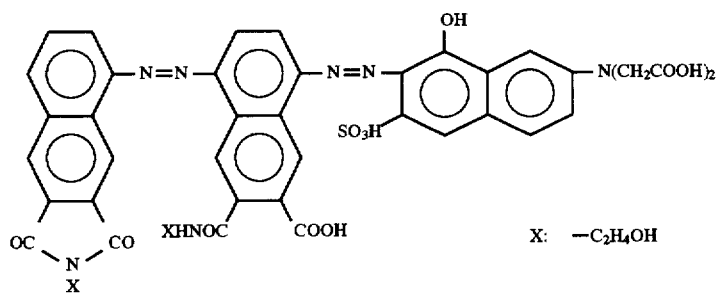
5-2
X: —C₂H₄OH
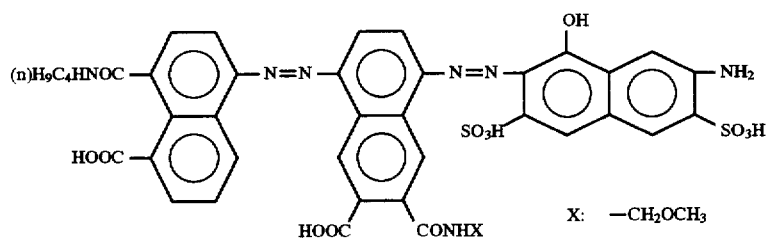
6-1
X: —CH₂OCH₃
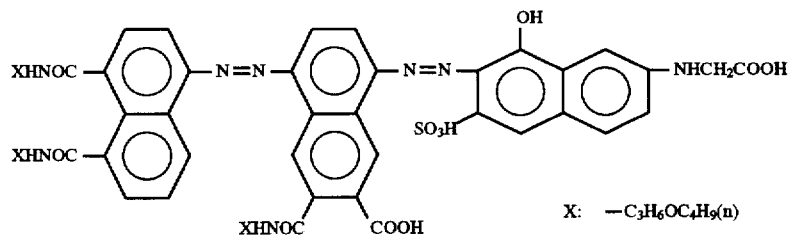
6-2
X: —C₃H₆OC₄H₉(n)
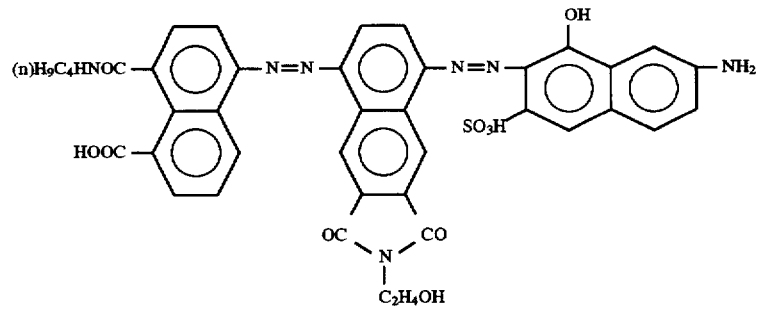
6-3
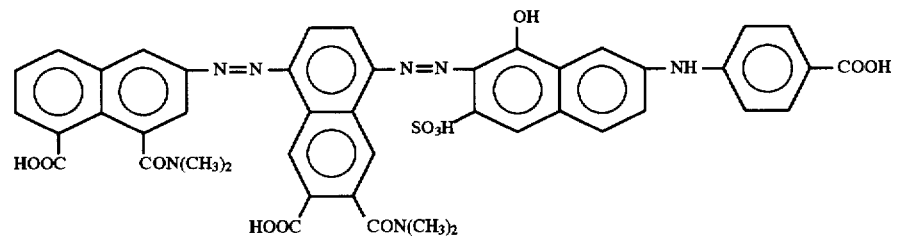
6-4

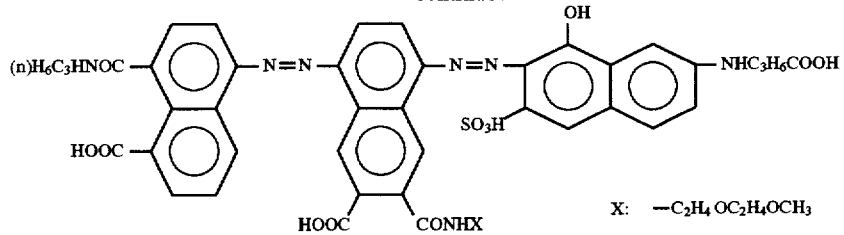

6-5

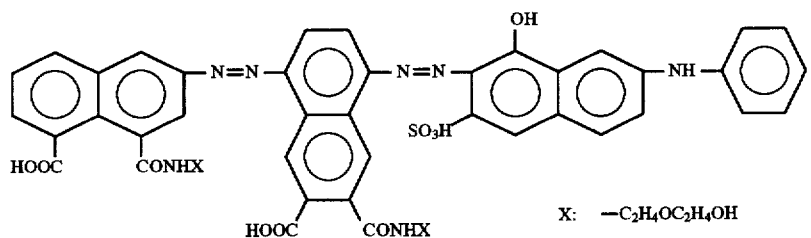

X: —C₂H₄OC₂H₄OCH₃

6-6

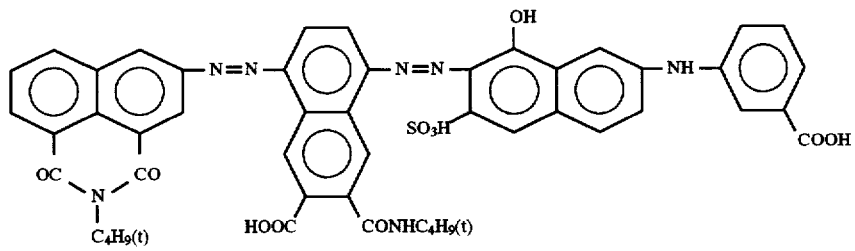

X: —C₂H₄OC₂H₄OH 7-1

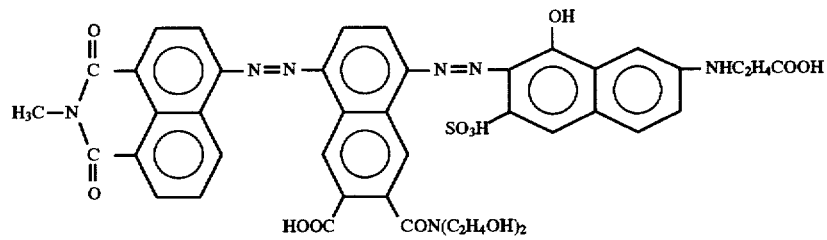

7-2

Now, the known literature of Great Britain Patent (GB) NO. 251625 and Japanese Patent application Laid-Open (KOKAI) 6-504562 describe dyes wherein three naphthalene rings are linked via two azo groups. These dyes of the known literature easily tends to bronze and not yield sufficient color density. On the contrary, in the dyes represented by the formulae (2) through (7) of the present invention, these defects are improved.

In the aforementioned general formula (8), it is preferable that $R^{32}$ represents —OCH₃ group or a group represented by the general formula [III], and it is more preferable that $R^{32}$ represents an —OCH₃ group or the group represented by the general formula [III] wherein Q is —CO—.

In the case where $R^{32}$ is a hydrogen atom, a —CH₃ group or an —OCH₃ group, it is preferable that $R^{33}$ is an —OCH₃ group, and it is more preferable that both of $R^{32}$ and $R^{33}$ are an —OCH₃ group. Further, in the case where $R^{32}$ is a group represented by the general formula [III], it is preferable that $R^{33}$ is a substituted or unsubstituted alkoxy group having 1 to 9 carbon atoms.

As the substituent for the alkyl group denoted by $R^{33}$, a phenyl group can be exemplified. As the substituent for the alkoxy group denoted by $R^{33}$, alkoxy group, hydroxyl group, hydroxy alkoxy group, phenyl group, —COOH group, alkoxy group substituted with —COOH group, etc. can be exemplified.

In the case where $R^{35}$ is a hydrogen atom, it is preferable that $R^{36}$ is a hydrogen atom or a phenyl group which may be substituted with a —SO₃H group or —COOH group. In the case where $R^{35}$ is an alkyl group having 1 to 3 carbon atoms which is substituted with a —COOH group, it is preferable that $R^{34}$ is a hydrogen atom or an alkyl group having 1 to 3 carbon atoms which is substituted with a —COOH group.

In the general formula [III], examples of the aryl group having 6 to 12 carbon atoms denoted by $R^{34}$ include an unsubstituted aryl group such as a phenyl group and naphthyl group, and a substituted aryl group such as a phenyl group or a naphthyl group, each having a substituent of an alkyl group or the like (the total carbon atoms of the substituent and aryl group is 6 to 12).

Also, in the general formula (8), the dye wherein the number of —COOH group in the molecule is the same as or more than the number of —SO₃H group therein is preferred.

Specific examples of a dye which are the free acid form thereof are represented by the formula (8-1) to (8-21) as set forth below. (The examples show free acid forms.)

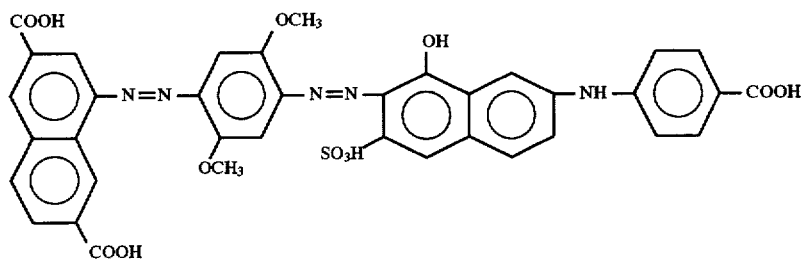
8-1
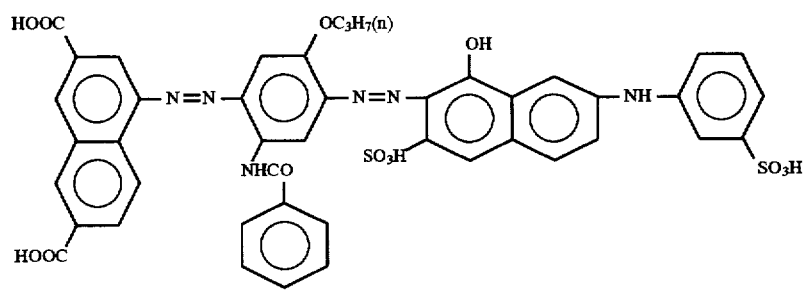
8-2
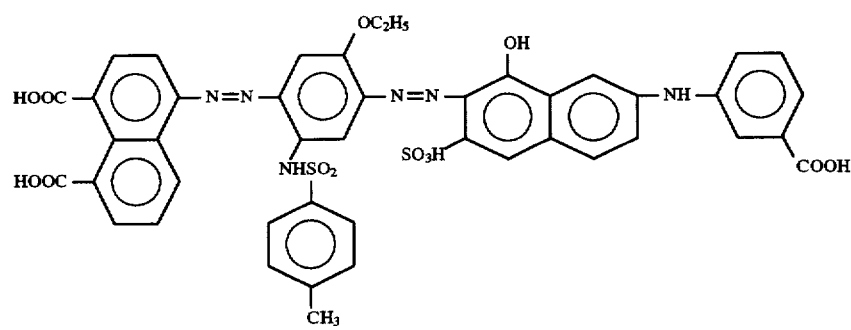
8-3
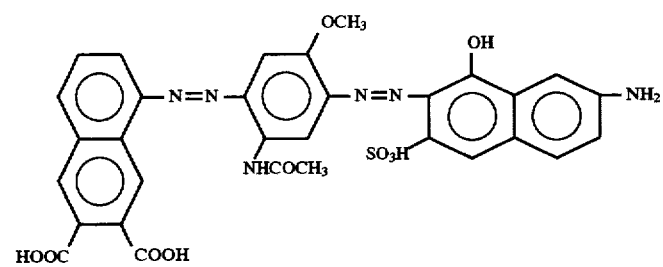
8-4
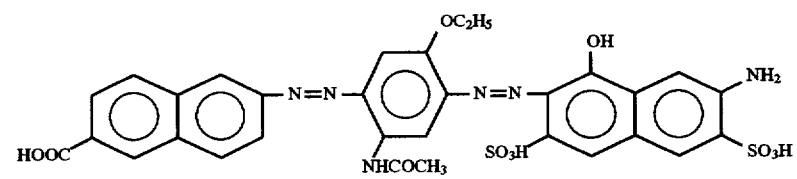
8-5
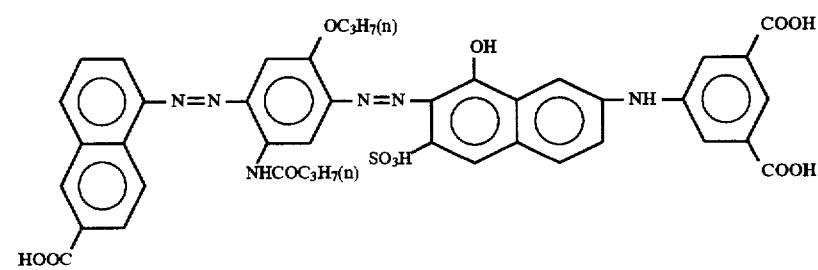
8-6

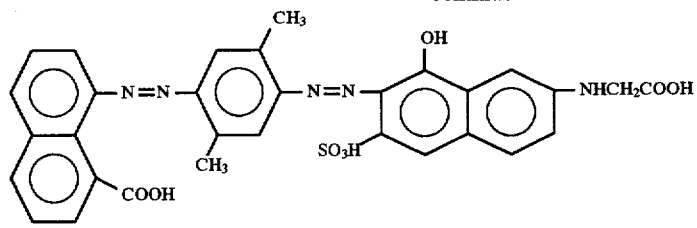
8-7
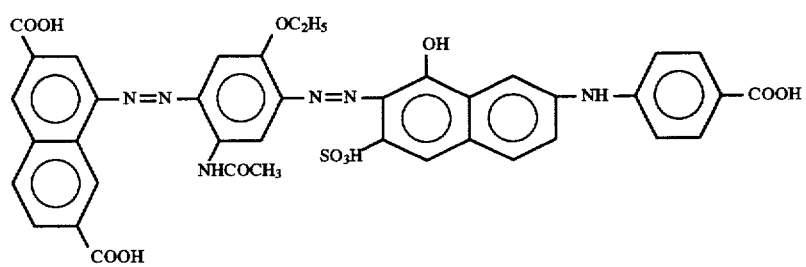
8-8
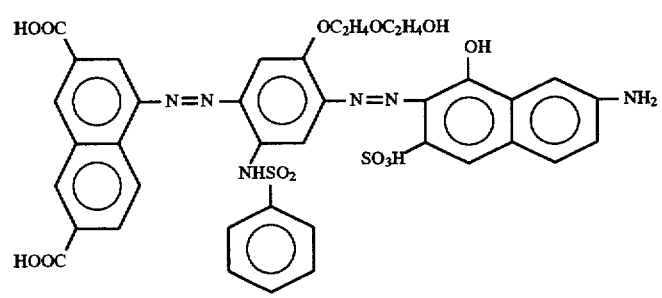
8-9
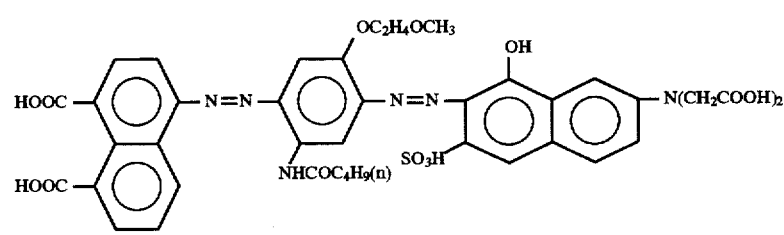
8-10
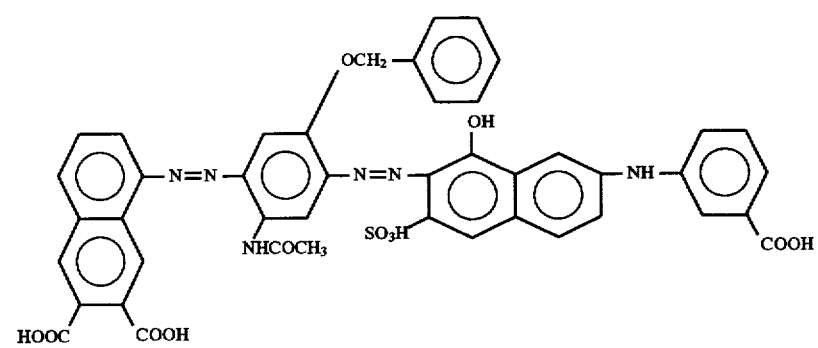
8-11
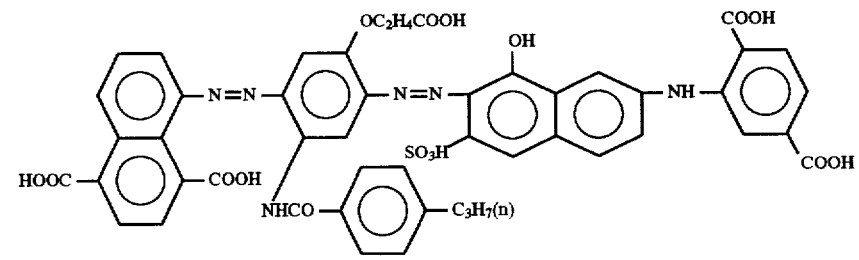
8-12

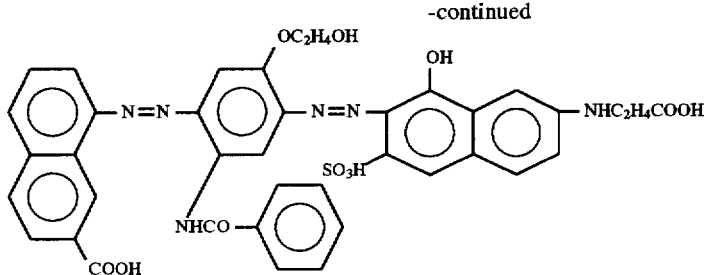
8-13
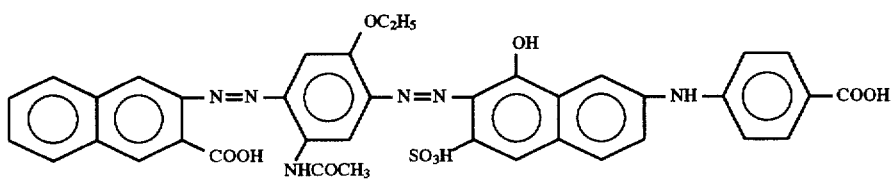
8-14
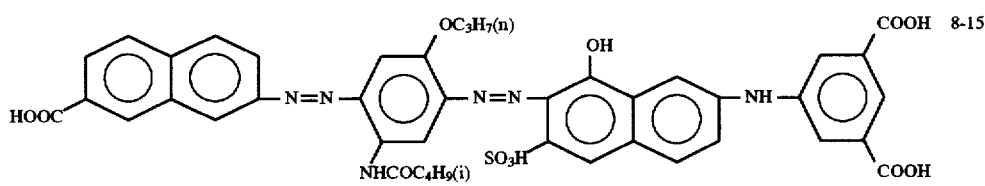
8-15
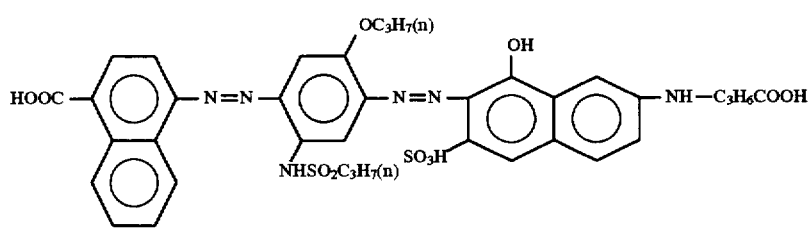
8-16
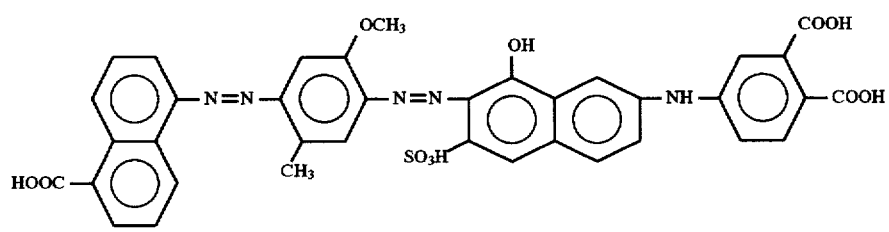
8-17
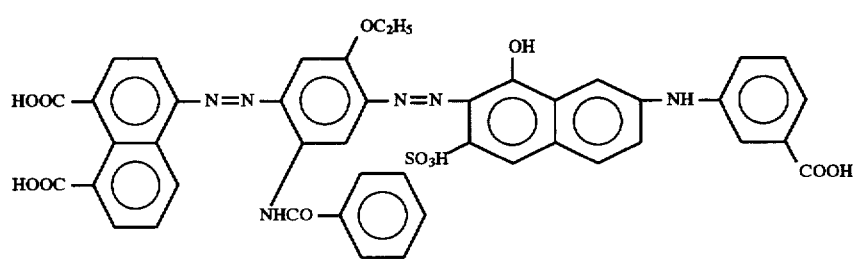
8-18
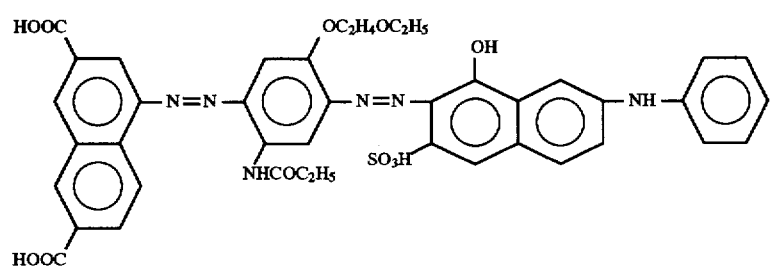
8-19

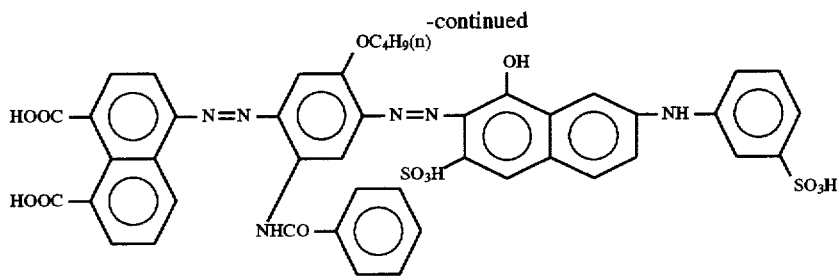

8-20

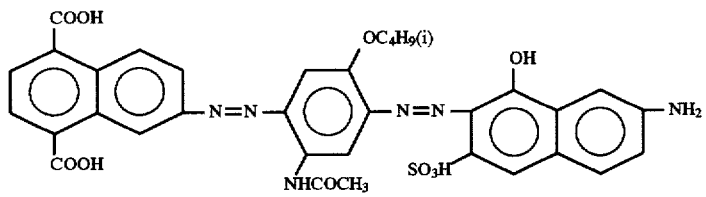

8-21

In the afore-mentioned general formulae (9) and (10), $R^{37}$, $R^{38}$, $R^{39}$, and $R^{40}$ each independently represent a hydrogen atom; an alkyl group having 1 to 4 carbon atoms such as the methyl group, ethyl group, propyl group and butyl group (these may be either straight-chain or branched); an alkoxy group-substituted alkyl group (the carbon number of the alkoxy group being 1 to 4) such as methoxy ethyl group, ethoxy ethyl group or butoxy methyl group; an alkoxy alkoxy group-substituted alkyl group (the carbon number of the alkoxy alkoxy group being 2 to 8) such as methoxy ethoxy ethyl group and methoxy propoxy ethyl group; or a morpholino group-substituted alkyl group such as the morpholino propyl group. However, both of $R^{37}$ and $R^{38}$ never represent a hydrogen atom at the same time. On the other hand, $R^{37}$ and $R^{38}$ or $R^{39}$ and $R^{40}$ may be combined with a nitrogen atom to which $R^{37}$ and $R^{38}$ or $R^{39}$ and $R^{40}$ are bonded to form a morpholino group. It is preferable that $R^{37}$, $R^{38}$, $R^{39}$, and $R^{40}$ are an alkyl group having 1 to 4 carbon atoms which is substituted with an alkoxy group having 1 to 4 carbon atoms, or an alkoxy alkoxy group having 2 to 8 carbon atoms, or a hydrogen atom.

S and T represent an alkyl group having 1 to 4 carbon atoms such as the methyl group, ethyl group and butyl group; an alkoxy group having 1 to 4 carbon atoms such as the methoxy group, ethoxy group and propoxy group; or an acyl amino group having 2 to 9 carbon atoms such as an alkoxy carbonyl amino group having 2 to 5 carbon atoms, e.g. an acetyl amino group and propionyl amino group, an aryl carbonyl amino group which may be substituted with an alkoxy group, e.g. benzoyl amino group, and p-methoxy benzoyl amino group, and it is more preferable that S and T are independently an alkoxy group having 1 to 4 carbon atoms or an acyl amino group having 2 to 9 carbon atoms, and still more preferable that S is an alkoxy group having 1 to 4 carbon atoms and T is an alkoxy group having 1 to 4 carbon atoms or an acyl amino group having 2 to 9 carbon atoms.

Further, in the above, in the case where an alkylene chain having 3 or more carbon atoms is to be contained in the above groups, that alkylene chain may be either straight-chain or branched.

U and V represent a —COOH group, a —CONH$_2$ group, a substituted carbamoyl group which has an alkyl group having 1 to 4 carbon atoms or a $C_{1-4}$ alkoxy-substituted alkyl group such as a —CONHCH$_3$ group, a —CONHC$_2$H$_4$OCH$_3$ group or a —CON(C$_3$H$_6$OCH$_3$)$_2$ group, or a morpholino carbonyl group. It is preferable that one of U and V is a —COOH group and the other is a carbamoyl group, a carbamoyl group which is substituted with an alkoxy alkyl group or morpholino carbonyl group.

$R^{41}$ represents a hydrogen atom, a phenyl group, or a phenyl group which is substituted with at least one carboxyl group such as m-carboxy phenyl group, p-carboxy phenyl group and 2,4-dicarboxy phenyl group.

Specific examples of a dye which are the free acid form thereof are represented by the formulae (9-1) to (9-9) and (10-1) to (10-6) as shown below. (The examples shown are free acid forms.)

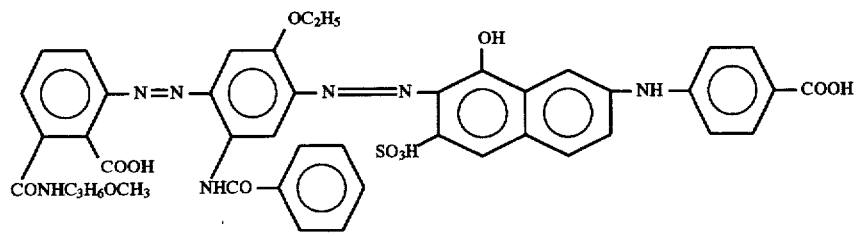

9-1

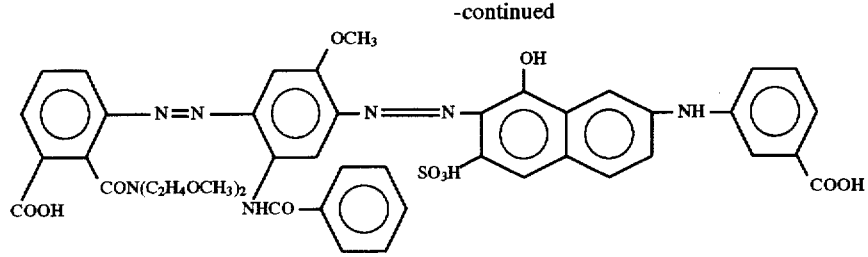
9-2
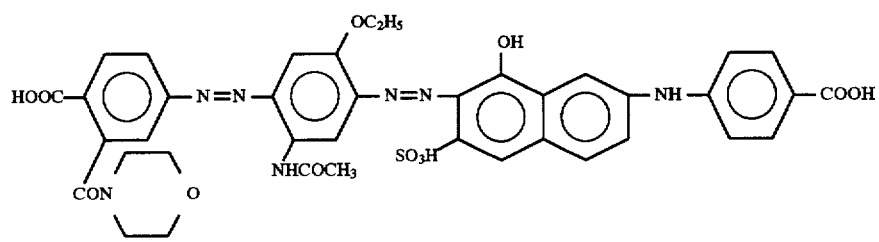
9-3
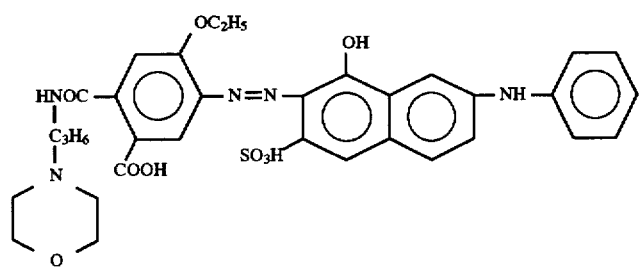
9-4
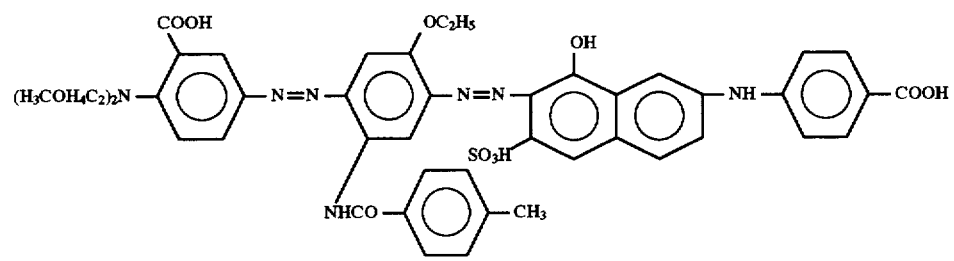
9-5
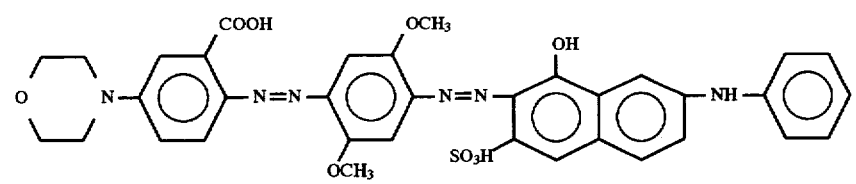
9-6
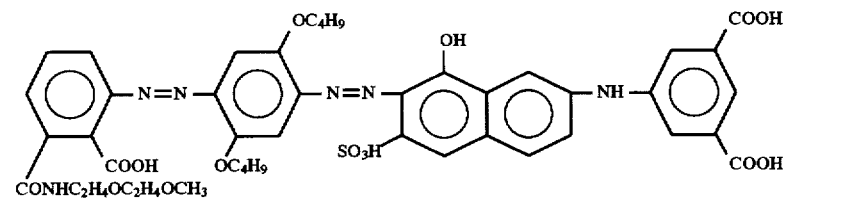
9-7
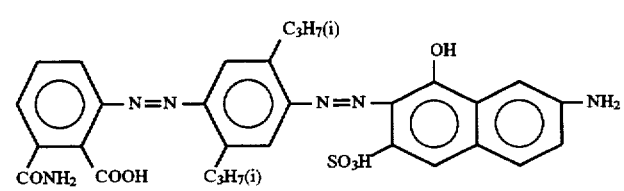
9-8

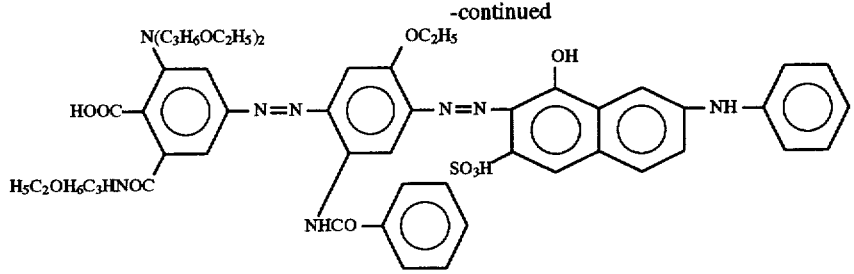
9-9
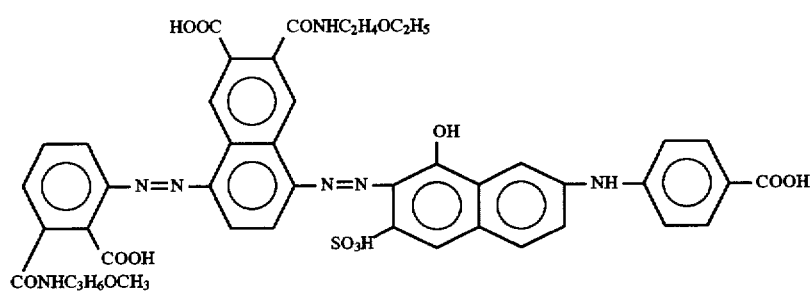
10-1
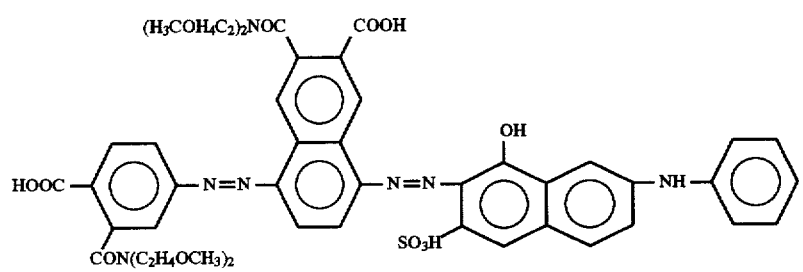
10-2
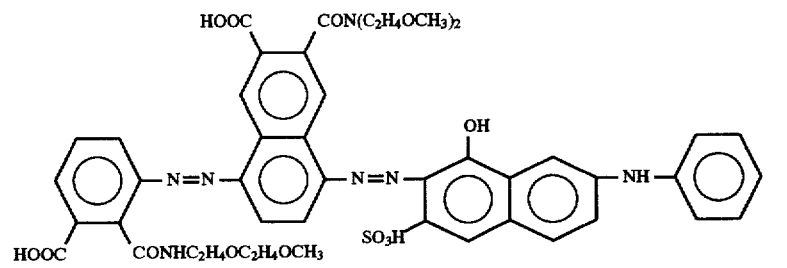
10-3
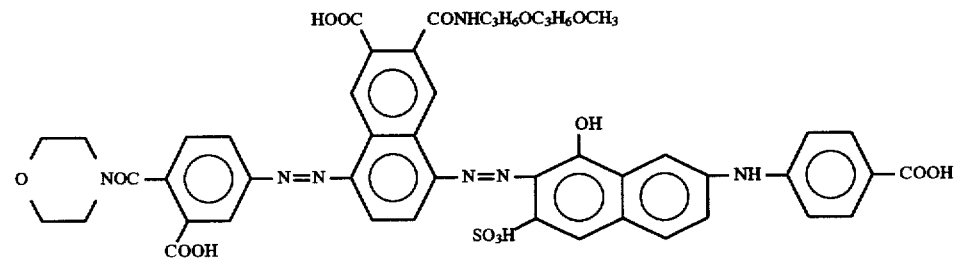
10-4
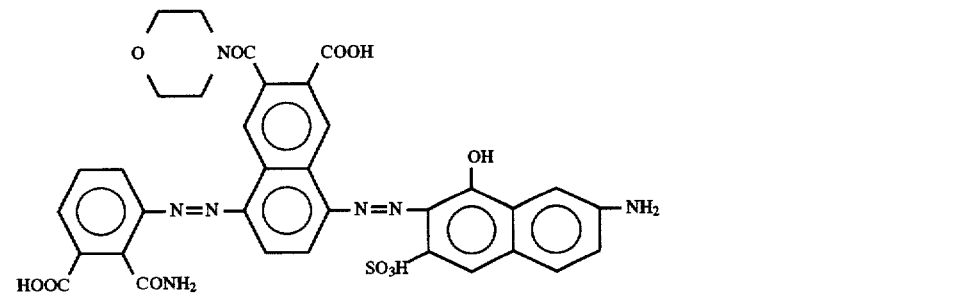
10-5

-continued

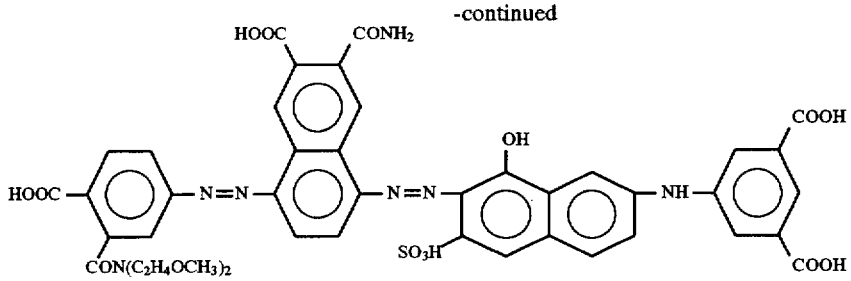

10-6

The dye used in the present invention may be used as the free acid form as shown in the general formulae (1) to (10), or may be a salt form. Further, part of the acid group in the dye molecule may be of a salt form, or salt-form dye and free acid-form dye may exist in a mixed form. Examples of such salt forms include salts of alkali metal salts such as Na, Li, K, etc.; an ammonium salt; and salts of organic amine salts which is substituted with alkyl group, hydroxy alkyl group, etc. Examples of organic amine include lower alkyl amine, hydroxy-substituted lower alkyl amine, carboxy-substituted lower alkyl amine, polyamine having 2 to 10 units of alkylene imine having 2 to 4 carbon atoms, etc. Regarding these salts, the kind of salt used is not limited to one kind, but multiple kinds of salts may be contained in one dye molecule, or multiple dyes of multiple kinds of salt form may exist in a mixed form.

Each of the dyes used in the present invention of which the free acid form is represented in the aforementioned general formulae (1) through (10) may be produced by following known methods (e.g., ref. "SHIN SENRYO KAGAKU" by Yutaka Hosoda (published by GIHODO Dec. 21, 1973), pp 396–409), via diazoration and coupling process.

The dyes represented in the aforementioned general formulae (1) through (10) may be used singly or in the form of the mixture thereof. Further, these dyes may be used in the form of the mixture with the other black dyes: e.g. Color Index food black 2: Color Index direct black 17, 19, 154, 163, 168, 171, 195; Color Index acid black 2; Color Index reactive black 31; "PONTAMINE Black SP Liquid" produced by Bayer Inc.; "BASACID Black X-34" produced by BASF Inc.; etc.

Although the recording ink according to the present invention is black, in the case of forming a full-color image, recording can be conducted by combining with the following dyes (each of the following is a Color Index name): for yellow ink, e.g. direct yellow 86, 132, 142 or acid yellow 23; for cyan ink, e.g. direct blue 86, 199 or acid blue 9; and for magenta ink, e.go acid red 35, 37, 52, 257, 289, direct red 80, 227 or hydrolytic substances of reactive red 180.

It is preferable that the total amount of dye contained within the recording liquid is 0.5 to 5% by weight, more preferably 2 to 4% by weight based on the total weight of recording liquid.

As the aqueous medium used in the present invention, water and a water-soluble organic solvent can be cited. For example, as the water soluble organic solvent, ethylene glycol, propylene glycol, butylene glycol, diethylene glycol, triethylene glycol, polyethylene glycol (average-weight molecular weight (Mw)=190–400), glycerin, N-methyl pyrrolidone, N-ethyl pyrrolidone, 1,3-dimethyl imidazolidinone, thiodiethonol, dimethyl sulfoxide, ethylene glycol monoallyl ether, ethylene glycol monomethyl ether, diethylene glycol monomethyl ether, 2-pyrolidone, sulfolane, ethyl alcohol, isopropyl alcohol, triethanol amine, etc. Generally, these water-soluble organic solvents are used in an amount of 1 to 50% by weight, preferably 5 to 30% by weight based on the total weight of the recording liquid. On the other hand, water is used in an amount of 45 to 95% by weight, preferably 60 to 90% by weight based on the total weight of the recording liquid.

By adding a compound selected from urea, thiourea, biuret and semicarbazide in an amount of 0.1 to 10% by weight, preferably 0.5 to 5% by weight, and/or a surfactant in an amount of 0.001 to 5.0% by weight, based on the total weight of the recording liquid, it is possible to further improve the quick drying characteristics of the recording liquid after recording and the recorded image quality.

The recording liquid according to the present invention is usable as an ink for ink-jet recording or for ordinary writing instrument. The required removal of impurities generated in the manufacturing process, adjustment of pH, deaeration processing, etc., are conducted by known method depending on the recording system using the recording liquid of the present invention.

In the ink-jet recording system using the recording liquid according to the present invention, the means of discharge used in this ink-jet recording may be electrical energy, heat energy, etc.

The recording liquid according to the present invention can be used for the ink-jet recording or for writing an ordinary writing instrument, and even when used for recording on plain paper, a black recorded image with high quality is obtained. The recording density, light resistance, and water resistance of the recording image are good, and moreover, the recording liquid having good storage stability. Particularly, good water resistance of the recording image is obtained regardless of the pH of the paper used for recording.

EXAMPLES

The following is a detailed description of the examples of the present invention, but the present invention is not limited in its scope to these examples.

Example 1

Water was added to 10 parts by weight of diethylene glycol, 3 parts by weight of isopropyl alcohol, and 3 parts by weight of a dye of the afore-mentioned No. 1-1, and the pH thereof was adjusted to 9 by adding aqueous ammonia thereto, so that the total amount thereof was made to 100 parts by weight. The resultant composition was sufficiently mixed and dissolved. The composition was pressure-filtered by a Teflon® filter having a pore diameter of 1 μm, and then was subjected to deaeration by a vacuum pump and supersonic cleansing device, thereby to prepare the recording liquid.

The recording liquid thus obtained was used with an ink-jet printer (trade name: BJ-10V, manufactured by CANON Inc.), and the ink-jet recording was conducted onto electrophotography paper (produced by XEROX Inc. ), thereby obtaining recording image of a blue-tinted black with a high density. The evaluation of the recorded image was conducted according to the following methods of (a), (b) and (c). The results are shown below.

(a) Light resistance of the recorded image

Using a xenon fade meter (manufactured by SUGA SHIKENKI Inc.), the recorded paper was irradiated for 100 hours. There was no degree of discoloration and fading of the recording image after irradiation.

(b) Water resistance of the recorded image

Comparative Examples 1 and 2

The same procedures as in the Example 1 were conducted except for using the dye according to the following formulae R-1 and R-2 described in Japanese patent Application Laid-Open (KOKAI) NO. 7-34020 instead of the dye No. 1-1 of Example 1. Using the obtained recording liquid, the ink-jet recording was conducted onto electrophotography papers A to C, thereby to obtain a recorded image. The same evaluations of (a), (b) and (c) as in Example 1 were conducted. The results thereof were shown in Table 1.

TABLE 1

[Chemical structures of R-1 and R-2 dyes]

| Dyes | Water resistance | | |
|---|---|---|---|
| | Paper A | Paper B | Paper C |
| No. 1-1 | ○ | ○ | ○ |
| R-1 | ○ | X | X |
| R-2 | ○ | Δ | X |

(NOTE)
Visual evaluation standard for water resistance:
○: Practically no blotting
Δ: Little blotting
X: Some blotting
Electrophotography paper A: The pH measured according to JIS P8133 was 5.35.
Electrophotography paper B: The pH measured according to JIS P8133 was 6.29.
Electrophotography paper C: The pH measured according to JIS P8133 was 9.23.

The recorded paper was immersed in tap water for 5 seconds. The blotting of the image was examined visually. No blotting of the image was recognized.

(c) Storage stability of the recording liquid

The recording liquid was sealed in a Teflon® container, and stored at a temperature of 5° C. and 60° C. for 1 month. The change of the recording liquid was examined. No deposition of insoluble matter was observed.

Example 2 to 4

The same procedures as in the Example 1 was conducted except for respectively using the dyes of the afore-mentioned No. 1-2, No. 1-3, and No. 1-4 instead of the dye No. 1-1 of Example 1 to prepare recording liquids. Using the obtained recording liquid, the ink-jet recording was conducted according to the same method as in Example 1 to obtain a black recording image. Further, the same evaluations of (a), (b) and (c) as in Example 1 were conducted. The results thereof were all good as same as shown in Example 1.

Example 5 to 10

The same procedures as in the Example 1 was conducted except for respectively using the dyes of the afore-mentioned NO. 1-5 to No. 1-10 instead of the dye No. 1-1 of Example 1 to prepare recording liquids. Using the obtained recording liquid, the ink-jet recording was conducted according to the same method as in Example 1 to obtain a black recording image. Further, the same evaluations of (a), (b) and (c) as in Example 1 were conducted. The results thereof were all good as same as shown in Example 1.

Example 11

The same procedures as in the Example 1 was conducted except for using the dyes of the afore-mentioned No. 1-11 instead of the dye No. 1-1 of Example 1 to prepare recording liquids. Using the obtained recording liquid, the ink-jet recording was conducted according to the same method as in Example 1 to obtain a black recording image. Further, the same evaluations of (a), (b) and (c) as in Example 1 were conducted. The results thereof were all good as in Example 1.

Further, the same ink-jet recording was conducted onto electrophotography papers A to C using the obtained recording liquid, thereby to obtain a recorded image. The same evaluations of (a), (b) and (c) as in Example 1 were conducted. The results thereof were shown in Table 2.

TABLE 2

| Dye | Water resistance | | |
| --- | --- | --- | --- |
| | Paper A | Paper B | Paper C |
| No. 1-11 | O | O | O |
| R-1 | O | X | X |
| R-2 | O | Δ | X |

Examples 12 to 30

The same procedures as in the Example 1 was conducted except for respectively using the dyes of the afore-mentioned No. 1-12 to No. 1-30 instead of the dye No. 1-1 of Example 1 to prepare recording liquids. Using the obtained recording liquid, the ink-jet recording was conducted according to the same method as in Example 1 to obtain a black recording image. Further, the same evaluations of (a), (b) and (c) as in Example 1 were conducted. The results thereof were all good as same as shown in Example 1.

The dye of No. 1-12 and 1-14 are a mixture composed of trans form and cis form of the —CH=CH—CH$_3$ group (1:1).

Example 31

The same procedures as in the Example 1 was conducted except for using the dyes of the afore-mentioned No. 2-1 instead of the dye No. 1-1 of Example 1 to prepare recording liquids. Using the obtained recording liquid, the ink-jet recording was conducted according to the same method as in Example 1 to obtain a black recording image of a high density (Color density: OD value of 1.31). Further, the same evaluation of (a) light resistance as in Example 1 was conducted. There was little degree of discoloration and fading of the recording image after irradiation.

The evaluation of the water resistance was conducted according to the following method (b-1).

(b-1) Water resistance of the recorded image (1) Testing method

The recorded image was immersed in tap water for 5 minutes and then:

(i) blotting of the image was examined visually; and (ii) OD values of the solid portion of the image before and after immersion were measured by a Macbeth densitometer (TR 927).

(2) Test results (i) Blotting of the image was slight.

(ii) The change of density of the solid image portion after immersion was represented by OD retention calculated from the following equation:

$$OD \text{ retention} = \frac{OD \text{ value after immersion}}{OD \text{ value before immersion}} \times 100(\%)$$

The OD retention was 98.4%.

Further, the same evaluation of (c) storage stability as in Example 1 was conducted. No deposition of insoluble matter was observed.

The results thereof are shown in the Table 3.

Example 32 to 34

The same procedures as in the Example 31 was conducted except for respectively using the dyes of the afore-mentioned No. 3-2, No. 2-7 and No. 2-11 instead of the dye No. 2-1 of Example 31 to prepare recording liquids. Using the obtained recording liquid, the ink-jet recording was conducted according to the same method as in Example 31 to obtain a black recording image. Further, the same evaluations of (a), (b-1) and (c) as in Example 31 were conducted. The results thereof were all good as same as shown in Example 31.

The OD retentions were 97.5%, 96.2% and 99.1%, respectively.

The results are shown in the Table 3.

Comparative Example 3

The same procedures as in the Example 31 was conducted except for using C. I. Food Black 2 as a dye instead of the dye No. 2-1 of Example 31 to prepare recording liquids. Using the obtained recording liquid, the ink-jet recording was conducted according to the same method as in Example 31 to obtain a black recording image. Further, the same evaluations of (a), (b-1) and (c) as in Example 31 were conducted.

The results are shown in the Table 3.

Comparative Example 4

The same procedures as in the Example 31 was conducted except for using compound represented by the following formula R-3 as described in Japanese Patent Application Laid-Open (KOKAI) No. 58-176261, instead of the dye No. 2-1 of Example 31 to prepare recording liquids. Using the obtained recording liquid, the ink-jet recording was conducted according to the same method as in Example 31 to obtain a black recording image. Further, the same evaluations of (a), (b-1) and (c) as in Example 31 were conducted.

The results are shown in the Table 3.

TABLE 3

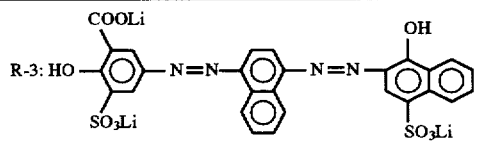

| Dye No. | (a) Light resistance | Visual evaluation | recorded density | OD retention (%) | (c) Storage stability | Solubility |
| --- | --- | --- | --- | --- | --- | --- |
| Example 31 | No. 2-1 | O | O | 1.31 | 98.4 | O | O |

TABLE 3-continued

R-3: HO—[benzene with SO₃Li]—N=N—[benzene]—N=N—[naphthalene with OH and SO₃Li]

(b-1) Water resistance

| | Dye No. | (a) Light resistance | Visual evaluation | recorded density | OD retention (%) | (c) Storage stability | Solubility |
|---|---|---|---|---|---|---|---|
| Example 32 | No. 3-2 | ○ | ○ | 1.30 | 97.5 | ○ | ○ |
| Example 33 | No. 2-7 | ○ | ○ | 1.33 | 96.2 | ○ | ○ |
| Example 34 | No. 2-11 | ○ | ○ | 1.30 | 99.1 | ○ | ○ |
| Com. Example 3 | C. I. FB-2 | Δ | x | 1.37 | 33.6 | ○ | ○ |
| Com. Example 4 | R-3 | ○ | x | 1.18 | 63.6 | ○ | ○ |

(NOTE)
○: Good
Δ: Slightly good
x: Poor

Examples 35 to 45

The same procedures as in the Example 31 was conducted except for respectively using the dyes of the aforementioned No. 2-2 to No. 2-6, No. 2-8 To No. 2-10, No. 3-1, No. 3-3 and No. 3-4 instead of the dye No. 2-1 of Example 31 to prepare recording liquids. Using the obtained recording liquid, the ink-jet recording was conducted according to the same method as in Example 31 to obtain a black recording image. Further, the same evaluations of (a), (b-1) and (c) as in Example 31 were conducted. The results thereof were all good as same as shown in Example 31.

The OD retentions were 98.8% (using the dye No. 3-1) and 98.2% (using the dye No. 2-2).

Example 46

The same procedures as in the Example 31 was conducted except for using the dyes of the afore-mentioned No. 4-1 instead of the dye No. 2-1 of Example 31 to prepare recording liquids. Using the obtained recording liquid, the ink-jet recording was conducted according to the same method as in Example 31 to obtain a black recording image of a high density (color density: OD value of 1.32). Further, the same evaluations of (a), (b-1) and (c) as in Example 31 were conducted. The results thereof were all good as same as shown in Example 31.

The results are shown in the Table 4.

Examples 47 to 49

The same procedures as in the Example 31 was conducted except for respectively using the dyes of the afore-mentioned No. 4-4, No. 6-1 and No. 6-6 instead of the dye No. 2-1 of Example 31 to prepare recording liquids. Using the obtained recording liquid, the ink-jet recording was conducted according to the same method as in Example 31 to obtain a black recording image. Further, the same evaluations of (a), (b-1) and (c) as in Example 31 were conducted. The results thereof were all good as same as shown in Example 31.

The results are shown in the Table 4.

Comparative Examples 5 and 6

The same procedures as in the Example 31 was conducted except for respectively using the compound represented by the following formula R-4 as described in Japanese Patent Application Laid-Open (KOKAI) No. 58-176262 and the compound R-5 as described in WO 92/13037 instead of the dye No. 2-1 of Example 31 to prepare recording liquids. Using the obtained recording liquid, the ink-jet recording was conducted according to the same method as in Example 31 to obtain a blue recording image (using the dye R-4) and black recording image (using the dye R-5). Further, the same evaluations of (a), (b-1) and (c) as in Example 31 were conducted.

The results are shown in the Table 4.

TABLE 4

R-4: [naphthalene with SO₃Na]—N=N—[benzene]—N=N—[naphthalene with OH, OH and SO₃Na]

R-5: [naphthalene with COONH₄]—N=N—[benzene with SO₃NH₄]—N=N—[naphthalene with OH and SO₃NH₄]—NH—[benzene]—COONH₂

(b-1) Water resistance

| | Dye No. | (a) Light resistance | Visual evaluation | recorded density | OD retention (%) | (c) Storage stability | Solubility |
|---|---|---|---|---|---|---|---|
| Example 46 | No. 4-1 | ○ | ○ | 1.32 | 98.7 | ○ | ○ |
| Example 47 | No. 4-4 | ○ | ○ | 1.33 | 98.1 | ○ | ○ |
| Example 48 | No. 6-1 | ○ | ○ | 1.31 | 96.8 | ○ | ○ |
| Example 49 | No. 6-6 | ○ | ○ | 1.30 | 98.8 | ○ | ○ |
| Com. Example 3 | C.I. FB-2 | Δ | x | 1.37 | 33.6 | ○ | ○ |
| Com. Example 5 | R-4 | Δ | x | 0.82 | 74.2 | Δ | Δ |
| Com. Example 6 | R-5 | ○ | Δ | 1.18 | 84.4 | Δ | ○ |

(NOTE)
○: Good
Δ: Slightly good
x: Poor

Examples 50 to 60

The same procedures as in the Example 31 was conducted except for respectively using the dyes of the afore-mentioned No. 4-2, No. 4-3, No. 4-5, No. 5-1, No. 5-2, No. 6-2 to No. 6-5, No. 7-1 and No. 7-2 instead of the dye No. 2-1 of Example 31 to prepare recording liquids, using the obtained recording liquid, the ink-jet recording was conducted according to the same method as in Example 31 to obtain a black recording image. Further, the same evaluations of (a), (b-1) and (c) as in Example 31 were conducted. The results thereof were all good as same as shown in Example 31.

The OD retentions were 99.1% (using the dye No. 5-1) and 97.2% (using the dye No. 4-2).

Example 61

The same procedures as in the Example 31 was conducted except for using the dyes of the afore-mentioned No. 8-1 instead of the dye No. 2-1 of Example 31 to prepare recording liquids. Using the obtained recording liquid, the ink-jet recording was conducted according to the same method as in Example 31 to obtain a black recording image of a color density OD value of 1.33. Further, the same evaluations of (a), (b-1) and (c) as in Example 31 were conducted.

The results are shown in the Table 5.

Examples 62 to 64

The same procedures as in the Example 31 was conducted except for respectively using the dyes of the afore-mentioned No. 8-6, No. 8-13 and No. 8-18 instead of the dye No. 2-1 of Example 31 to prepare recording liquids. Using the obtained recording liquid, the ink-gel recording was conducted according to the same method as in Example 31 to obtain a black recording image. Further, the same evaluations of (a), (b-1) and (c) as in Example 31 were conducted. The results thereof were all good as same as shown in Example 31.

The OD retentions were 99.1%, 97.8% and 99.8%, respectively.

The results are shown in the Table 5.

Comparative Example 7

The game procedures as in the Example 31 was conducted except for using the compound represented by the following formula R-6 as described in Japanese Patent Laid-Open (KOKAI) No. 6-220377 instead of the dye No. 2-1 of Example 31 to prepare recording liquid. Using the obtained recording liquid, the ink-jet recording was conducted according to the same method as in Example 31 to obtain a black recording image. Further, the same evaluations of (a), (b-1) and (c) as in Example 31 were conducted.

The results are shown in the Table 5.

TABLE 5

R-6: [structure with phenyl-N=N-phenyl(OCH₃)(OC₂H₅)-N=N-naphthyl(OH)(SO₃H)(NH₂), with COOH on first ring]

| Dye No. | (a) Light resistance | (b) Water resistance Visual evaluation | recorded density | OD retention (%) | (c) Storage stability | Solubility |
|---|---|---|---|---|---|---|
| Example 61 | No. 8-1 | ○ | ○ | 1.33 | 98.6 | ○ | ○ |
| Example 62 | No. 8-6 | ○ | ○ | 1.30 | 99.1 | ○ | ○ |
| Example 63 | No. 8-13 | ○ | ○ | 1.31 | 97.8 | ○ | ○ |
| Example 64 | No. 8-18 | ○ | ○ | 1.33 | 99.8 | ○ | ○ |
| Com. Example 3 | C.I. FB-2 | Δ | x | 1.37 | 33.6 | ○ | ○ |
| Com. Example 7 | R-6 | ○ | Δ | 1.21 | 81.1 | Δ | x |

(NOTE)
○: Good
Δ: Slightly good
x: Poor

Examples 65 to 81

The same procedures as in the Example 31 was conducted except for respectively using the dyes of the afore-mentioned No. 8-2 to No. 8-5, No. 8-7 to No. 8-12, No. 8-14 to No. 8-17, No. 8-19 and No. 8-21 instead of the dye No. 2-1 of Example 31 to prepare recording liquids. Using the obtained recording liquid, the ink-jet recording was conducted according to the same method as in Example 31 to obtain a black recording image. Further, the same evaluations of (a), (b-1) and (c) as in Example 31 were conducted. The results thereof were all good as same as shown in Example 31.

The OD retentions were 99.5% (using the dye No. 8-2) and 97.8% (using the dye No. 8-5).

Example 82

The same procedures as in the Example 31 was conducted except for using the dyes of the afore-mentioned No. 9-1 instead of the dye No. 2-1 of Example 31 to prepare recording liquids. Using the obtained recording liquid, the ink-jet recording was conducted according to the same method as in Example 31 to obtain a black recording image of a color density (OD value) of 1.33. Further, the same evaluations of (a), (b-1) and (c) as in Example 31 were conducted.

The results are shown in the Table 6.

(d) Discharge stability

Stable continuous discharge was successfully conducted for 3 hours even in a room with an adjusted environment of 30° C. and RH (relative humidity) 20%.

Example 83 to 85

The same procedures as in the Example 82 was conducted except for respectively using the dyes of the afore-mentioned No. 9-2, No. 9-5 and No. 10-1 instead of the dye No. 9-1 of Example 82 to prepare recording liquids. Using the obtained recording liquid, the ink-jet recording was conducted according to the same method as in Example 82 to obtain a black recording image. Further, the same evaluations of (a), (b-1) and (c) as in Example 31 were conducted. The results thereof were all good as same as shown in Example 82.

The OD retentions were 99.0%, 98.8% and 99.2%, respectively.

The results are shown in the Table 6.

Comparative Examples 8 and 9

The same procedures as in the Example 82 was conducted except for respectively using the compounds represented by the following formula R-7 as described in WO 92/13037, the dye represented by following formula R-8 described in Japanese Patent Application Laid-Open (KOKAI) No. 7-34020, the dye R-1 used in the Comparative Example 1 (described in Japanese Patent Application Laid-Open (KOKAI) No. 7-34020), and the C. I. Food Black 2 used in the Comparative Example 3, instead of the dye No. 9-1 of Example 82 to prepare recording liquids. Using the obtained recording liquid, the ink-jet recording was conducted according to the same method as in Example 82 to obtain a black recording image. Further, the same evaluations of (a), (b-1) and (c) as in Example 31 were conducted.

The results are shown in the Table 6.

TABLE 6

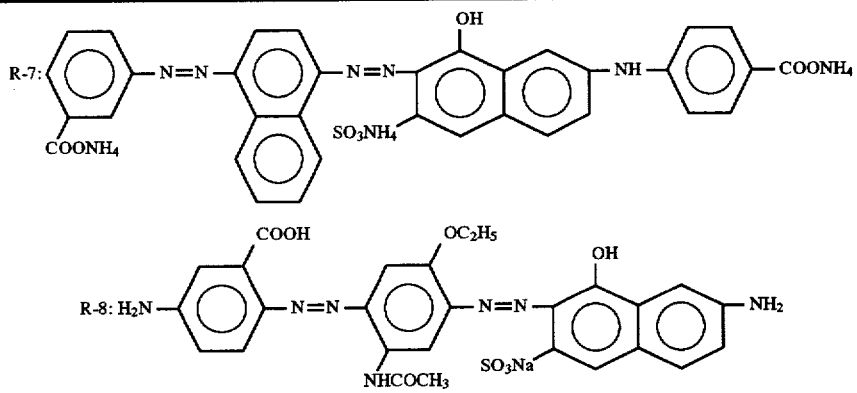

| | Dye No. | (a) Light resistance | Visual evaluation | (b-1) Water resistance recorded density | OD retention (%) | (c) Storage stability | Solbility | (d) Discharge stability |
|---|---|---|---|---|---|---|---|---|
| Example 82 | No. 9-1 | ○ | ○ | 1.33 | 98.9 | ○ | ○ | ○ |
| Example 83 | No. 9-2 | ○ | ○ | 1.34 | 99.0 | ○ | ○ | ○ |
| Example 84 | No. 9-5 | ○ | ○ | 1.32 | 98.8 | ○ | ○ | ○ |
| Example 85 | No.10-1 | ○ | ○ | 1.30 | 99.2 | ○ | ○ | ○ |
| Com. Example 3 | C.I. FB-2 | Δ | x | 1.37 | 33.6 | ○ | ○ | Δ |
| Com. Example 1 | R-1 | ○ | ○ | 1.32 | 98.5 | Δ | ○ | Δ |
| Com. Example 8 | R-7 | ○ | ○ | 1.22 | 99.1 | Δ | ○ | Δ |
| Com. Example 9 | R-8 | ○ | Δ | 1.25 | 94.3 | Δ | Δ | Δ |

(NOTE)
○: Good
Δ: Slightly good
x: Poor

Examples 86 to 102

The same procedures as in the Example 82 was conducted except for respectively using the dyes of the aforementioned No. 9-3, No. 9-4, No. 9-6 to No. 9-9 and No. 10-2 to No. 10-6 instead of the dye No. 9-1 of Example 82 to prepare recording liquids. Using the obtained recording liquid, the ink-jet recording was conducted according to the same method as in Example 82 to obtain a black recording image. Further, the same evaluations of (a), (b-1), (c) and (d) as in Example 82 were conducted. The results thereof were all good as same as shown in Example 82.

What is claimed:

1. A recording liquid comprising an aqueous medium and at least one dye selected from compounds whose free acid form represented by the following general formulae (1) through (10):

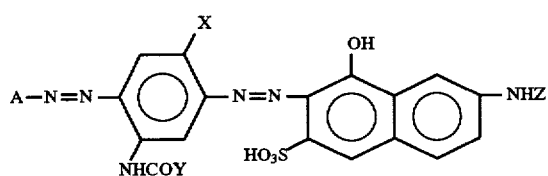

(1)

wherein A represents a phenyl group or naphthyl group, which may have a substituent selected from the group consisting of an amino group, an acyl amino group, a hydroxyl group, a carboxylic acid group (—COOH) and a sulfonic acid group (—SO₃H); X represents a hydrogen atom, an alkyl group having 1 to 4 carbon atoms or an alkoxy group having 1 to 4 carbon atoms; Y represents

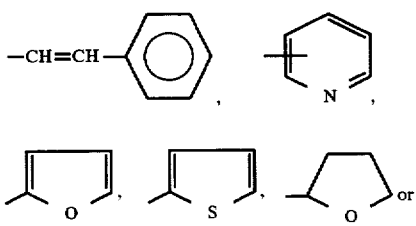

—CH=CH—CH₃; and Z represents a hydrogen atom or a phenyl group which may have a substituent,

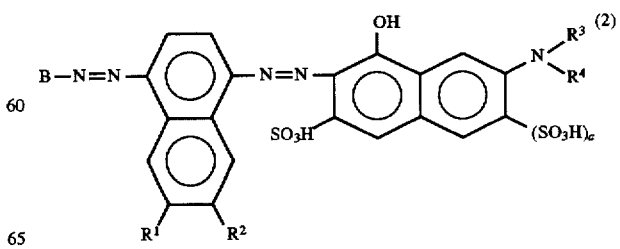

(2)

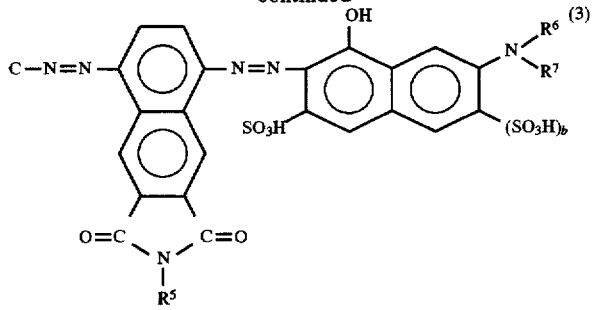
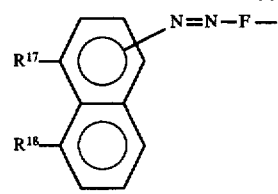
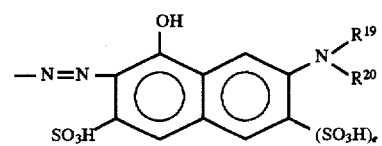

(3)

wherein B and C each independently represent a naphthyl group having a substituent of a —COOH group, or a —SO$_3$H group, or a phenyl group having a substituent selected from the group consisting of a —COOH group, a —SO$_3$H group, an amino group, an acyl amino group, a hydroxyl group, a halogen atom, a substituted or unsubstituted alkyl group having 1 to 9 carbon atoms and a substituted or unsubstituted alkoxy group having 1 to 9 carbon atoms; R$^1$ and R$^2$ each independently represent a —COOH group or a —CONR$^8$R$^9$ group provided that both of R$^1$ and R$^2$ never represent a —COOH group at the same time; R$^3$ and R$^6$ each independently represent a hydrogen atom, a phenyl group which may be substituted by a —SO$_3$H group or a —COOH group, or an alkyl group having 1 to 3 carbon atoms which is substituted with a —COOH group; R$^4$ and R$^7$ each independently represent a hydrogen: atom or an alkyl group having 1 to 3 carbon atoms which is substituted with a —COOH group; R$^5$, R$^8$ and R$^9$ each independently represent a hydrogen atom or a substituted or unsubstituted alkyl group having 1 to 9 carbon atoms; a and b each independently are 0 or 1.

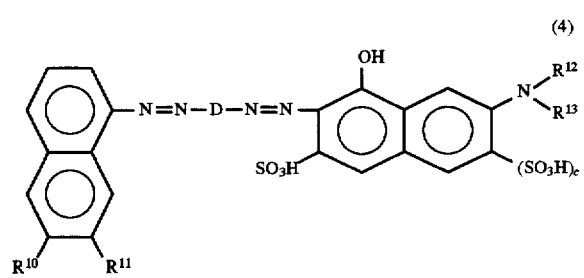

(4)

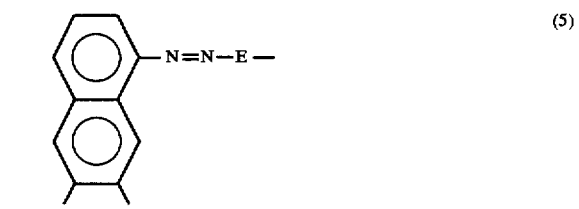

(5)

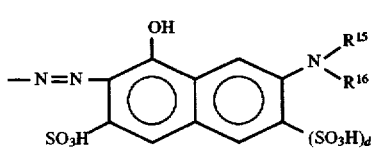

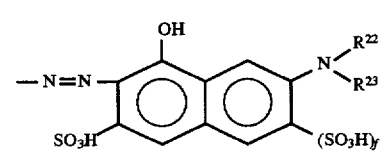

(6)

(7)

wherein R$^{10}$ and R$^{11}$ each independently represent a —COOH group or a —CONR$^{24}$R$^{25}$ group provided that both of R$^{10}$ and R$^{11}$ never represent a —COOH group at the same time; R$^{17}$ and R$^{18}$ each independently represent a —COOH, group or a —CONR$^{26}$R$^{27}$ group provided that both of R$^{17}$ and R$^{18}$ never represent a —COOH group at the same time; D, E, F and G each independently represent the groups represented by the formula [I] or [II]; R$^{12}$, R$^{15}$, R$^{19}$ and R$^{22}$ each independently represent a hydrogen atom, a phenyl group which may be substituted with a —SO$_3$H group or a —COOH group, or an alkyl group having 1 to 3 carbon atoms which is substituted with a —COOH group; R$^{13}$, R$^{16}$, R$^{20}$ and R$^{23}$ each independently represent a hydrogen atom or an alkyl group having 1 to 3 carbon atoms which is substituted with a —COOH group; R$^{14}$, R$^{21}$, R$^{24}$, R$^{25}$, R$^{26}$ and R$^{27}$ each independently represent a hydrogen atom or a substituted or unsubstituted alkyl group having 1 to 9 carbon atoms; and c, d, e and f each independently are 0 or 1.

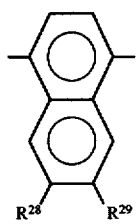

[I]

-continued

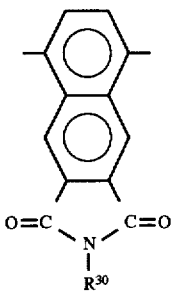
[II]

wherein $R^{28}$ and $R^{29}$ each independently represent a —COOH group or a —CONR$^{31}$R$^{32}$ group provided that both of $R^{28}$ and $R^{29}$ never represent a —COOH group at the same time; and $R^{30}$, $R^{31}$ and $R^{32}$ each independently represent a hydrogen atom or a substituted or unsubstituted alkyl group having 1 to 9 carbon atoms.

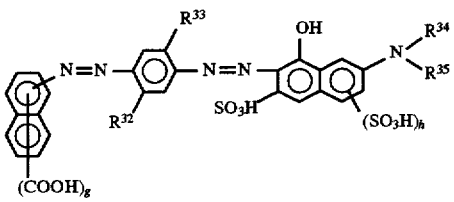
(8)

wherein $R^{32}$ represents a hydrogen atom, a —CH$_3$ group, an —OCH$_3$ group or a group represented by the formula [III], $R^{33}$ represents a hydrogen atom, a —CH$_3$ group or an —OCH$_3$ group when $R^{32}$ represents a hydrogen atom, a —CH$_3$ group or an —OCH$_3$ group; or $R^{33}$ represents a hydrogen atom, a substituted or unsubstituted alkyl group having 1 to 9 carbon atoms or a substituted or unsubstituted alkoxy group having 1 to 9 carbon atoms when $R^{32}$ represents a group represented by the formula [III]; $R^{34}$ represents a hydrogen atom, a phenyl group which may be substituted with a —SO$_3$H group or a —COOH group, or an alkyl group having 1 to 3 carbon atoms which is substituted with a —COOH group; $R^{35}$ represents a hydrogen atom or an alkyl group having 1 to 3 carbon atoms which is substituted with a —COOH group; g is 1 or 2; and h is 0 or 1.

—NHQR$^{36}$  [III]

wherein Q represents —CO— or —SO$_2$—; and $R^{36}$ represents an alkyl group having 1 to 6 carbon atoms or an aryl group having 6 to 12 carbon atoms.

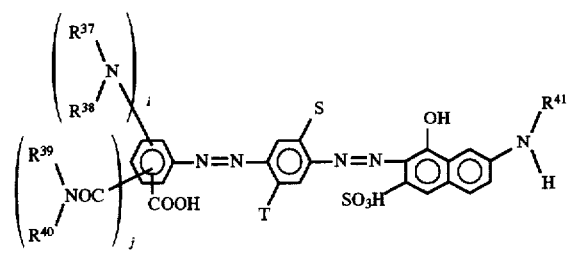
(9)

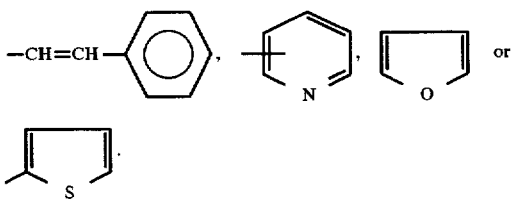
(10)

wherein $R^{37}$, $R^{38}$, $R^{39}$ and $R^{40}$ each independently represent an alkyl group having 1 to 4 carbon atoms which may be substituted with a morpholino group, an alkoxy group having 1 to 4 carbon atoms or an alkoxy-alkoxy group having 2 to 8 carbon atoms, or a hydrogen atom; $R^{37}$ and $R^{38}$ or $R^{39}$ and $R^{40}$ may be combined with a nitrogen atom, to which $R^{37}$ and $R^{38}$ or $R^{39}$ and $R^{40}$ are bonded, to form morpholino group, provided that both of $R^{37}$ and $R^{38}$ never represent a hydrogen atom at the same time; S and T each independently represent an alkoxy group having 1 to 4 carbon atoms, an alkyl group having 1 to 4 carbon atoms, or an acyl amino group having 2 to 9 carbon atoms; U and V each independently represent a —COOH group, a substituted or unsubstituted carbamoyl group or a morpholino carbonyl group, provided that both of U and V never represent a COOH group at the same time; $R^{41}$ represents a hydrogen atom or a phenyl group which may be substituted by a —COOH group; and i and j each independently is either 0 or 1, provided that both of i and j are never 0 at the same time.

2. A recording liquid according to claim 1, wherein a free acid form of the dye is represented by the general formula (1).

3. A recording liquid according to claim 1, wherein Z in the general formula (1) is a hydrogen atom, or a phenyl group which may be substituted with a —COOH group, a —SO$_3$H group, an alkyl group having 1 to 4 carbon atoms or an alkoxy group having 1 to 4 carbon atoms.

4. A recording liquid according to claim 1, wherein A and Z in the general formula (1) are a phenyl group having at least one —COOH group as a substituent, and X is an alkoxy group having 1 to 4 carbon atoms.

5. A recording liquid according to claim 1, wherein the number of —COOH group is the same as or more than the number of —SO$_3$H group in the general formula (1).

6. A recording liquid according to claim 1, wherein Y in the general formula (1) is

7. A recording liquid according to claim 1, wherein a free acid form of the dye is represented by the general formula (2), or the general formula (3).

8. A recording liquid according to claim 1, wherein B in the general formula (2) is a phenyl group or naphthyl group having at least one —COOH as a substituent.

9. A recording liquid according to claim 1, wherein $R^4$ represents a hydrogen atom, and $R^3$ represents a hydrogen atom or a phenyl group which may be substituted by a —SO$_3$H group or a —COOH group in the general formula (2).

10. A recording liquid according to claim 1, wherein $R^4$ is an alkyl group having 1 to 3 carbon atoms which is substituted with a —COOH group, and $R^3$ is a hydrogen atom or an alkyl group having 1 to 3 carbon atoms which is substituted with a —COOH group in the general formula (2).

11. A recording liquid according to claim 1, wherein C in the general formula (3) is a phenyl group or naphthyl group having at least one —COOH group as a substituent.

12. A recording liquid according to claim 1, wherein $R^7$ is a hydrogen atom, and $R^6$ is a hydrogen atom or a phenyl group which may be substituted with a —SO$_3$H group or a —COOH group in the general formula (3).

13. A recording liquid according to claim 1, wherein $R^7$ is an alkyl group having 1 to 3 carbon atoms which is substituted with a —COOH group, and $R^6$ is a hydrogen atom or an alkyl group having 1 to 3 carbon atoms which is substituted with a —COOH group in the general formula (3).

14. A recording liquid according to claim 1, wherein the number of —COOH group is the same as or more than the number of —SO$_3$H group in the general formula (2).

15. A recording liquid according to claim 1, wherein the number of —COOH group is the same as or more than the number of —SO$_3$H group in the general formula (3).

16. A recording liquid according to claim 1, wherein a free acid form is represented by the formulae (4), (5), (6) or (7).

17. A recording liquid according to claim 1, wherein $R^{12}$ is a phenyl group which may be substituted by a —SO$_3$H group or a —COOH group, and $R^{13}$ is a hydrogen atom in the general formula (4).

18. A recording liquid according to claim 1, wherein $R^{15}$ is a phenyl group which may be substituted by a —SO$_3$H group or a —COOH group, and $R^{16}$ represents a hydrogen atom in the general formula (5).

19. A recording liquid according to claim 1, wherein $R^{19}$ is a phenyl group which may be substituted by a —SO$_3$H group or a —COOH group, and $R^{20}$ is a hydrogen atom in the general formula (6).

20. A recording liquid according to claim 1, wherein $R^{22}$ is a phenyl group which may be substituted by a —SO$_3$H group or a —COOH group, and $R^{23}$ is a hydrogen atom in the general formula (7).

21. A recording liquid according to claim 1, wherein the number of —COOH groups is the same as or more than the number of —SO$_3$H groups in the general formula (4).

22. A recording liquid according to claim 1, wherein the number of —COOH groups is the same as or more than the number of —SO$_3$H groups in the general formula (5).

23. A recording liquid according to claim 1, wherein the number of —COOH groups is the same as or more than the number of —SO$_3$H groups in the general formula (6).

24. A recording liquid according to claim 1, wherein the number of —COOH groups is the same as or more than the number of —SO$_3$H groups in the general formula (7).

25. A recording liquid according to claim 1, wherein a free acid form is represented by the formula (8).

26. A recording liquid according to claim 1, wherein $R^{32}$ is a group represented by the general formula [III], and $R^{33}$ is a substituted or unsubstituted alkoxy group having 1 to 9 carbon atoms in the general formula (8).

27. A recording liquid according to claim 1, wherein both of $R^{32}$ and $R^{33}$ are an —OCH$_3$ group in the general formula (8).

28. A recording liquid according to claim 1, wherein $R^{34}$ is a hydrogen atom or a phenyl group which may be substituted by a —SO$_3$H group or a —COOH group, and wherein $R^{35}$ is a hydrogen atom in the general formula (8).

29. A recording liquid according to claim 1, wherein $R^{34}$ is a hydrogen atom or an alkyl group having 1 to 3 carbon atoms which is substituted with a —COOH group, and $R^{35}$ is an alkyl group having 1 to 3 carbon atoms which is substituted with a —COOH group in the general formula (8).

30. A recording liquid according to claim 1, wherein the number of —COOH groups is the same as or more than the number of —SO$_3$H groups in the general formula (8).

31. A recording liquid according to claim 1, wherein a free acid form of the dye is represented by the general formula (9), or the general formula (10).

32. A recording liquid according to claim 1, wherein $R^{37}$, $R^{38}$, $R^{39}$ and $R^{40}$ are an alkyl group having 1 to 4 carbon atoms which may be substituted with an alkoxy group having 1 to 4 carbon atoms or an alkoxy alkoxy group having 2 to 8 carbon atoms, or a hydrogen atom in the general formula (9).

33. A recording liquid according to claim 1, wherein $R^{37}$, $R^{38}$, $R^{39}$ and $R^{40}$ are an alkyl group having 1 to 4 carbon atoms which may be substituted with an alkoxy group having 1 to 4 carbon atoms or an alkoxy alkoxy group having 2 to 8 carbon atoms, or a hydrogen atom in the general formula (10).

34. A recording liquid according to claim 1, wherein S is an alkoxy group having 1 to 4 carbon atoms, and T is an alkoxy group having 1 to 4 carbon atoms or an acyl amino group having 2 to 9 carbon atoms in the general formula (9).

35. A recording liquid according to claim 1, wherein one of U or V is a —COOH group, and the other is a carbamoyl group, a carbamoyl group which is substituted with an alkoxy alkyl group, or a morpholino carbonyl group in the general formula (10).

36. A recording liquid according to claim 1, wherein the aqueous medium comprises water and a water-soluble organic solvent selected from the group consisting of ethylene glycol, propylene glycol, butylene glycol, diethylene glycol, triethylene glycol, polyethylene glycol (weight-average molecular weight (Mw)=190-400), glycerin, N-methyl pyrrolidone, N-ethyl pyrrolidone, 1,3-dimethyl imidazolidinone, thiodiethanol, dimethyl sulfoxide, ethylene glycol monoallyl ether, ethylene glycol monomethyl ether, diethylene glycol monomethyl ether, 2-pyrrolidone, sulfolane, ethyl alcohol, isopropyl alcohol and triethanol amine.

37. A recording liquid according to claim 1, wherein the amount of dye contained in the recording liquid is 0.5 to 5% by weight based on the total weight of recording liquid.

38. A method for printing indicia on a record comprising the steps of: providing an ink-jet printing instrument; providing the recording liquid of claim 1 in said ink-jet printing instrument printing indicia formed of said recording liquid on paper using said ink-jet printing instrument.

* * * * *